(12) United States Patent
Namekawa

(10) Patent No.: US 9,985,549 B2
(45) Date of Patent: May 29, 2018

(54) CONTROL OF A DEAD TIME IN A DC-DC CONVERTER

(71) Applicant: KABUSHIKI KAISHA TOSHIBA, Tokyo (JP)

(72) Inventor: Toshimasa Namekawa, Ota Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/253,886

(22) Filed: Sep. 1, 2016

(65) Prior Publication Data

US 2017/0077821 A1    Mar. 16, 2017

(30) Foreign Application Priority Data

Sep. 11, 2015  (JP) ................................. 2015-179714

(51) Int. Cl.
*H02M 3/337* (2006.01)
*H02M 1/38* (2007.01)
*H02M 1/00* (2006.01)

(52) U.S. Cl.
CPC .............. *H02M 3/337* (2013.01); *H02M 1/38* (2013.01); *H02M 2001/0058* (2013.01); *Y02B 70/1491* (2013.01)

(58) Field of Classification Search
CPC ......... H02M 2001/0032; H02M 3/156; H02M 2001/0025; H02M 3/33507; H02M 3/33523; H02M 3/33584; H02M 2001/007; H02M 3/1588; H02M 1/14; H02M 1/15; H02M 2001/0048; H02M 3/3378; H02M 2003/1566
See application file for complete search history.

(56) References Cited

U.S. PATENT DOCUMENTS

| 8,102,677 | B2 | 1/2012 | Nakanishi |
| 8,716,998 | B2 | 5/2014 | Namekawa et al. |
| 8,928,302 | B2 | 1/2015 | Namekawa |
| 2008/0252271 | A1* | 10/2008 | Iwamura ............. H02M 3/1588 323/271 |

(Continued)

FOREIGN PATENT DOCUMENTS

| JP | 4702497 B1 | 6/2011 |
| JP | 2013153620 A | 8/2013 |

(Continued)

*Primary Examiner* — Henry Lee, III
(74) *Attorney, Agent, or Firm* — Patterson & Sheridan, LLP

(57) ABSTRACT

A DC-DC converter includes a first switch connected between an input node and a switching node, a second switch connected between a reference node and the switching node, a capacitor having a first terminal connected to one of the input node and the reference node, a transformer including a primary coil connected between the switching node and a second terminal of the capacitor, and a secondary coil, a rectification smoothing circuit that rectifies and smooths a voltage of the secondary coil, and a drive circuit. The drive circuit alternately turns on the first and second switches, such that a dead time during which both the first and second switches are turned off has a length corresponding to a time period during which a voltage of the switching node is transitioning from a low state to a high state or the high state to the low state.

18 Claims, 12 Drawing Sheets

(56) References Cited

U.S. PATENT DOCUMENTS

| | | |
|---|---|---|
| 2013/0194827 A1 | 8/2013 | Chen |
| 2014/0084882 A1 | 3/2014 | Namekawa |
| 2016/0065081 A1* | 3/2016 | Raju ................. H02M 3/33569 363/21.1 |

FOREIGN PATENT DOCUMENTS

| | | |
|---|---|---|
| JP | 5298679 B2 | 9/2013 |
| JP | 5306400 B2 | 10/2013 |
| JP | 2014064417 A | 4/2014 |
| JP | 5802638 B2 | 10/2015 |

* cited by examiner

CONTROL OF A DEAD TIME IN A DC-DC CONVERTER

CROSS-REFERENCE TO RELATED APPLICATION

This application is based upon and claims the benefit of priority from Japanese Patent Application No. 2015-179714, filed on Sep. 11, 2015, the entire contents of which are incorporated herein by reference.

FIELD

Embodiments described herein relate generally to a DC-DC converter, in particular, control of a dead time in the DC-DC converter.

BACKGROUND

Recently, an isolated-type AC-DC conversion power supply device (hereinafter, referred to as an isolated-type AC-DC converter) and an isolated-type DC-DC conversion power supply device (hereinafter, referred to as an isolated-type DC-DC converter) have been made smaller by increasing a switching frequency. However, when the device is made smaller, heat generation caused in accordance with loss of power conversion may more negatively affect the device. For that reason, it is desirable to increase power conversion efficiency, which is approximately 90% in the related art, to 95% or more. However, generally, if the switching frequency of a switching power supply increases, switching loss of the switching power supply increases, and thus, the heat generation increases.

To reduce the switching loss that leads to the heat generation, a technology of performing zero-volt switching (ZVS) according to a current resonance control method has been proposed. According to the current resonance control method, the switching frequency is modulated based on a feedback signal of an output power supply voltage, to maintain the output power supply voltage to be constant. Roughly speaking, a resonance state of a resonant circuit including a capacitor connected in series to leakage inductance on a primary side of an isolated-type transformer is controlled by modulating the switching frequency, and an output voltage on a secondary side of the isolated-type transformer is controlled by changing a voltage conversion coefficient. At this time, a time period (dead time) in which a high-side switching element and a low-side switching element are maintained to be turned off in common is provided, whereby a potential of a switching node is autonomously changed from a high potential to a low potential, or from a low potential to a high potential by action of a resonance current, in the dead time. After the autonomous transition of the potential is completed, the high-side or low-side switching element is turned on, and thus, the switching loss can be reduced and efficiency can be increased. This is called soft switching.

However, if timing to turn on the switching element is delayed, a diode connected in parallel with the switching element operates, and the switching loss occurs due to ON resistance thereof. In contrast, if timing when the switching element is turned on becomes fast, large primary noise may be generated by a hard switching operation, and simultaneously, a through current flows, so that large switching loss occurs. In the worst case, the switching element can be broken by heat which is generated due to the switching loss. That is, setting the dead time with an appropriate length is an important issue of an AC-DC converter and a DC-DC converter which employ the current resonance control method.

Meanwhile, time of the autonomous voltage transition of the switching node, which is performed by a soft switching operation, changes depending on a magnitude of the resonance current. For example, the resonance current changes according to feedback control of the output voltage, along with a change of a voltage of a primary power supply (supplying power supply) or a change of a load current of a secondary power supply (output power supply), and thus, the voltage transition time of the switching node changes every moment.

DETAILED DESCRIPTION

An embodiment provides a semiconductor device and a DC-DC converter that can increase conversion efficiency.

In general, according to an embodiment, a DC-DC converter includes a first switch connected between an input node and a switching node, a second switch connected between a reference node and the switching node, a capacitor having a first terminal connected to one of the input node and the reference node, a transformer including a primary coil connected between the switching node and a second terminal of the capacitor, and a secondary coil, a rectification smoothing circuit that rectifies and smooths a voltage of the secondary coil, and a drive circuit. The drive circuit alternately turns on the first and second switches, such that a dead time during which both the first and second switches are turned off has a length corresponding to a time period during which a voltage of the switching node is transitioning from a low state to a high state or the high state to the low state.

Hereinafter, embodiments will be described with reference to the drawings.

First Embodiment

Figure 1:
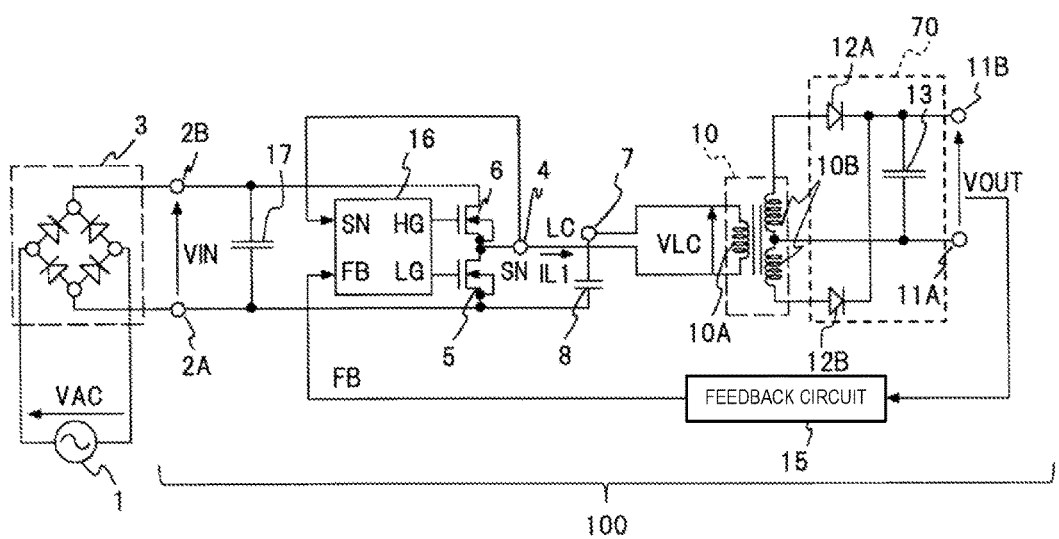
FIG. 1 is a block diagram of an isolated-type AC-DC converter according to a first embodiment.

FIG. 1 is a block diagram of an isolated-type AC-DC converter according to a first embodiment. The isolated-type AC-DC converter includes a rectification circuit 3, an input capacitor 17, an isolated-type DC-DC converter 100. The isolated-type DC-DC converter 100 includes a low-side switching transistor (second switch element) 5, a high-side switching transistor (first switch element) 6, a resonance capacitor 8, an isolated transformer 10, a diode (first rectification element) 12A, a diode (second rectification element) 12B, an output capacitor 13, a feedback circuit 15, and a control circuit 16.

The rectification circuit 3 includes a diode bridge, rectifies an AC voltage VAC which is supplied from an AC input power source 1, and generates an input voltage VIN. The input capacitor 17 smooths the input voltage VIN.

The input voltage VIN is supplied to a first input node 2B. A reference input voltage (ground voltage) is supplied to a second input node 2A.

The low-side switching transistor 5 is connected between the second input node 2A and a switching node 4.

The high-side switching transistor 6 is connected between the first input node 2B and the switching node 4.

The resonance capacitor 8 includes one terminal connected to the second input node 2A and the other terminal connected to a resonance node 7. The one terminal of the resonance capacitor 8 may be connected to the first input node 2B instead of the second input node 2A. In addition, an additional resonance capacitor having one terminal connected to the first input node 2B and the other terminal connected to the resonance node 7 may be provided in addition to the resonance capacitor 8.

The isolation transformer 10 includes a primary coil 10A and a secondary coil 10B. The primary coil 10A is connected between the switching node 4 and the resonance node 7 (the other terminal of the resonance capacitor 8).

The diode 12A includes an anode connected to one terminal of the secondary coil 10B and a cathode connected to a first output node 11B.

The diode 12B includes an anode connected to the other terminal of the secondary coil 10B and a cathode connected to the first output node 11B.

A second output node 11A is connected to an intermediate point of the secondary coil 10B. The output capacitor 13 is connected between the first output node 11B and the second output node 11A. An output voltage VOUT is a voltage difference between the first output node 11B and the second output node 11A.

The diodes 12A and 12B and the output capacitor 13 function as a rectification smoothing circuit 70 which generates the output voltage VOUT by performing a full-wave rectification of a voltage of the secondary coil 10B and smoothing the rectified voltage.

The feedback circuit 15 generates a feedback signal FB corresponding to the output voltage VOUT. One terminal to which the output voltage VOUT is supplied is insulated from the other terminal from which the feedback signal FB is output, in the feedback circuit 15.

The control circuit 16 generates a high-side gate signal (first drive signal) HG which drives a gate terminal of the high-side switching transistor 6, and a low-side gate signal (second drive signal) LG which drives a gate terminal of the low-side switching transistor 5. The control circuit 16 controls frequencies of the high-side gate signal HG and the low-side gate signal LG based on the feedback signal FB, thereby maintaining the output voltage VOUT to be at a constant setting voltage. In addition, the control circuit 16 measures a voltage transition time of the switching node 4, and sets a dead time corresponding to the voltage transition time to time between an edge of the high-side gate signal HG and an edge of the low-side gate signal LG. The control circuit 16 may be a semiconductor integrated circuit (semiconductor device).

Figure 2:
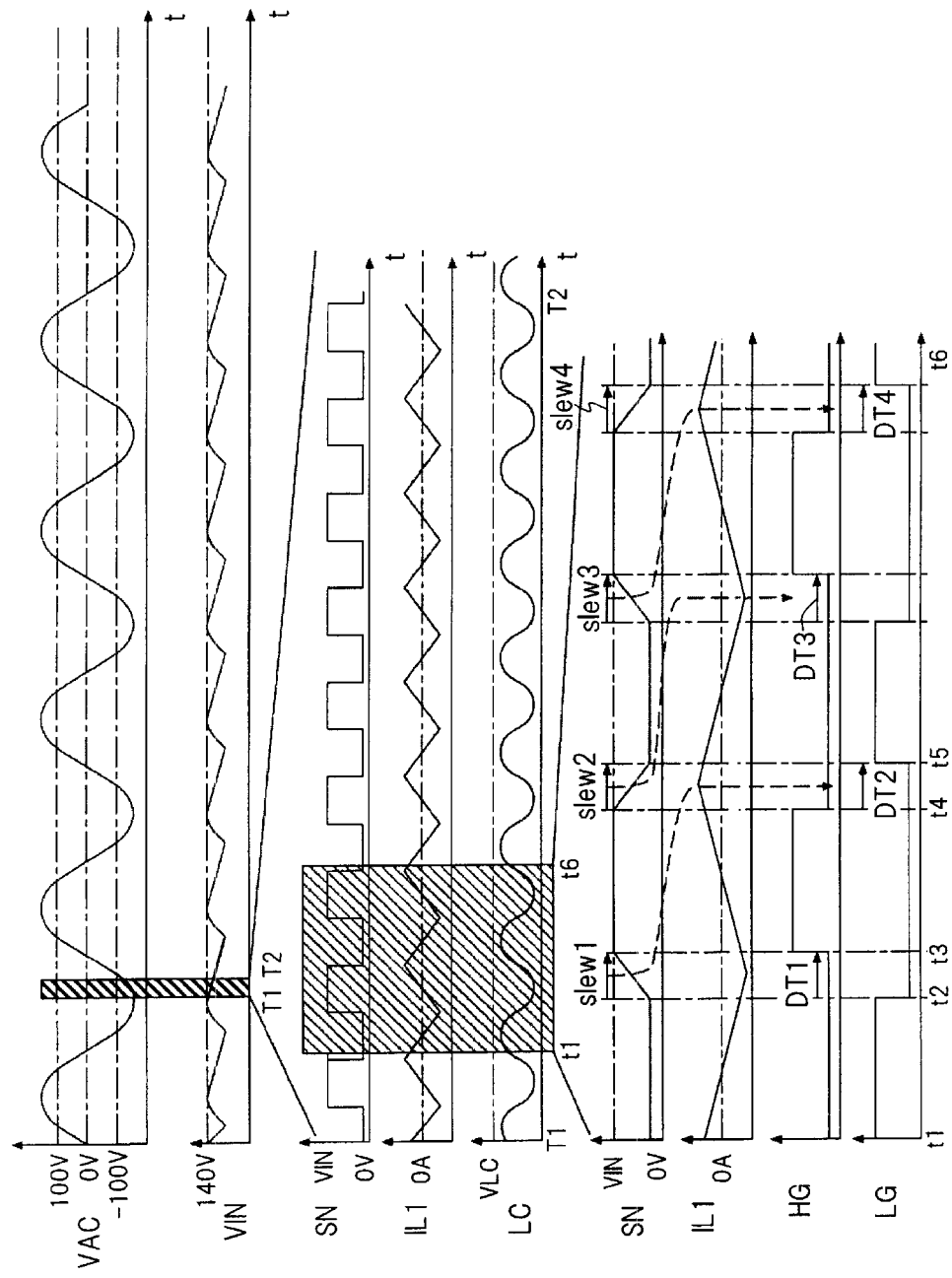
FIG. 2 is a waveform diagram of each signal generated in the isolated-type AC-DC converter in FIG. 1.

FIG. 2 is a waveform diagram of each signal generated in the isolated-type AC-DC converter in FIG. 1.

The AC voltage VAC has, for example, an effective voltage of 100 V and a frequency of 50 Hz. Charges of the input voltage VIN, which is obtained by rectifying the AC voltage VAC, are accumulated in the input capacitor 17. As a result, the input voltage VIN has a waveform which pulsates at a frequency of 100 Hz and is smoothed with a peak value of approximately 140 V.

The low-side switching transistor 5 and the high-side switching transistor 6 alternately repeat turning on and off at a frequency of, for example, several hundred KHz to several MHz. As a result, a voltage SN of the switching node 4 generally has a rectangular wave. A waveform diagram of the voltage SN in FIG. 2 is obtained by expanding a time axis between times T1 and T2 of a waveform diagram of the input voltage VIN in FIG. 2.

A current IL1 with a triangular wave illustrated in FIG. flows through the primary coil 10A of the isolation transformer 10 which receives the voltage SN with a rectangular wave of the switching node 4. A voltage LC of the resonance node 7 to which the current IL1 with the triangular wave flows has a waveform of a consecutive quadratic curve illustrated in FIG. 2. A cycle of the voltage LC of the resonance node 7 is the same as a cycle of the voltage SN of the switching node 4, and a phase thereof is shifted by 180 degrees. In addition, an amplitude of the voltage LC varies depending strongly on a switching cycle due to a resonance phenomenon. A voltage amplitude VLC of the switching waveform which is applied to the primary coil 10A of the isolation transformer 10 is a voltage of half the sum of the input voltage VIN and an absolute value |LC| of the voltage LC of the resonance node 7, and the voltage can be controlled by varying the switching cycle.

Here, the secondary coil 10B of the isolation transformer 10 and the diodes 12A and 12B configure a full-wave rectifier. A ratio of the voltage VLC of the switching waveform which is applied to the primary coil 10A of the isolation transformer 10 with respect to the output voltage VOUT is the same as a ratio of the number of windings of the primary coil 10A of the isolation transformer 10 with respect to the number of windings of the secondary coil 10B. For that reason, by generating the feedback signal FB based on the output voltage VOUT detected by the feedback circuit 15, transmitting the feedback signal FB to the control circuit 16, and controlling frequencies (switching frequencies) of the low-side gate signal LG and the high-side gate signal HG, it is possible to maintain the output voltage VOUT to be constant.

In more detail, a waveform of the voltage SN of the switching node 4 is observed has a trapezoidal waveform in which a rising waveform and a falling waveform are tilted, as illustrated in the waveform diagram of which time axis is expanded between times t1 to t6 in FIG. 2.

If the low-side gate signal LG is changed from a high state to a low state at time t2, the low-side switching transistor 5 is changed from a turn-on state to a turn-off state. At this time, the high-side gate signal HG is in a low state, and thus, the high-side switching transistor 6 also enters a turn-off state. Regardless of this, the voltage SN of the switching node 4 increases after time t2. The reason is that the current IL1 flowing through the primary coil 10A of the isolation transformer 10 at this time becomes negative and thus, the switching node 4 is charged with the current IL1, as illustrated in FIG. 2. Eventually, the voltage SN of the switching node 4 reaches the input voltage VIN of the first input node 2B at time t3 after a voltage transition time slew1 from time t2. At this timing, the high-side gate signal HG is changed from a low state to a high state, and the high-side switching transistor 6 is turned on. By this operation, switching loss can be reduced to a minimum, and conversion efficiency can be increased. In order to carry out such operations, the voltage transition time slew1 of the switching node 4 is measured, and next time, the measured time is set as the time from time when the high-side gate signal HG enters a low state to time when the low-side gate signal LG enters a high state, that is, dead time DT2.

In the same manner, also in a case where the high-side gate signal HG is changed from a high state to a low state (time t4), if the time (dead time DT2) when the high-side switching transistor 6 and the low-side switching transistor 5 are maintained to be turned off in common is provided, the voltage SN of the switching node 4 autonomously decreases. This is because the current IL1 flowing through the primary coil 10A of the isolation transformer 10 at this time becomes positive, and thus, the switching node 4 is discharged by the current IL1. Eventually, the voltage SN of the switching node 4 reaches a reference input voltage (0 V) of the second input node 2A, at time t5 after transition time slew2 from time t4. At this time, the low-side gate signal LG is changed from a low state to a high state, and the low-side switching transistor 5 is turned on. By this operation, switching loss can be reduced to a minimum, and conversion efficiency can be increased. In order to carry out such operations, voltage transition time slew2 of the switching node 4 is measured, and next time, the measured time is set as the time from time when the low-side gate signal LG enters a low state to time when the high-side gate signal HG enters a high state, that is, dead time DT3.

Such operations are repeated, and subsequent dead times DT[n+1] are sequentially adjusted according to the voltage transition times slew[n] (n is a positive integer). Hence, it is possible set the dead times DT[n+1] so as to follow a change of the voltage transition time slew[n] of the switching node 4.

That is, the control circuit 16 sets the voltage transition times slew[n] (n is 2, 4, 6, . . . ) when the voltage SN of the switching node 4 is changed from a high voltage (input voltage VIN) to a low voltage (reference input voltage), as the dead times DT[n+1] which are from when the low-side gate signal LG is changed from an active state (high state) to an inactive state (low state) until the high-side gate signal HG is changed from an inactive state to an active state.

In addition, the control circuit 16 sets the voltage transition times slew[n] (n is 1, 3, 5, . . . ) when the voltage SN of the switching node 4 is changed from a low voltage to a high voltage, as the dead times DT[n+1] which are from when the high-side gate signal HG is changed from an active state to an inactive state until the low-side gate signal LG is changed from an inactive state to an active state.

According to the first embodiment described above, the dead time DT[n+1] according to the voltage transition time slew[n] of the switching node 4 is set to the time between an edge of the high-side gate signal HG and ab edge of the low-side gate signal LG. As a result, the high-side switching transistor 6 or the low-side switching transistor 5 can be turned on at an appropriate timing, even if the voltage transition times slew[n] are changed in accordance with a change or the like of operation conditions. Accordingly, it is possible to perform soft switching, regardless of the change or the like of the operation conditions. Hence, it is possible to provide an isolated-type AC-DC converter and the isolated-type DC-DC converter 100 which can increase conversion efficiency and have high efficiency.

The dead times DT[n+1] may be any time period according to the voltage transition time slew[n], and may not be the same as the voltage transition time slew[n]. For example, the dead times DT[n+1] may be time which is obtained by adding a predetermined time period to the voltage transition time slew[n], and may be time which is obtained by subtracting a predetermined time period from the voltage transition time slew[n]. However, the shorter the predetermined time period is, the more the conversion efficiency can be increased.

Second Embodiment

In a second embodiment, a half-wave rectification is performed instead of the full-wave rectification.

Figure 3:
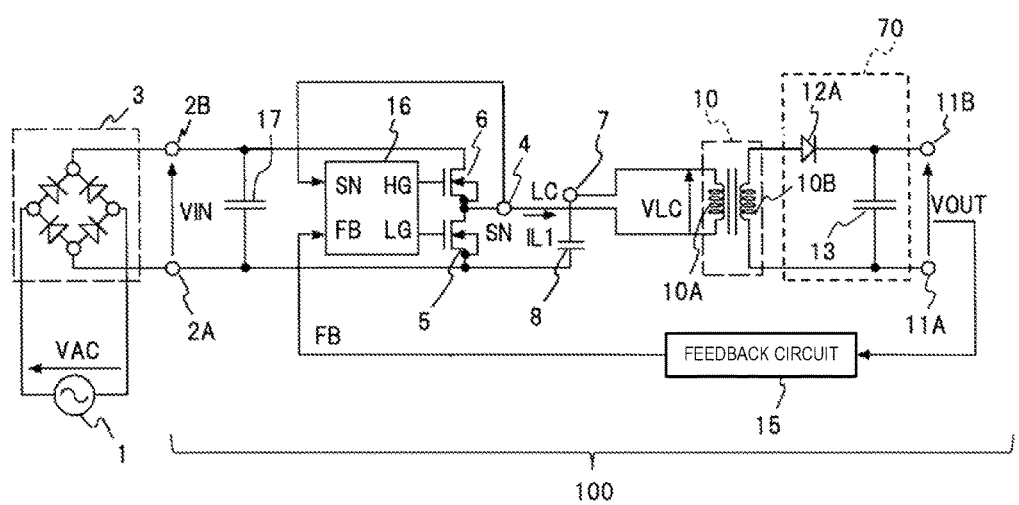
FIG. 3 is a block diagram of an isolated-type AC-DC converter according to a second embodiment.

FIG. 3 is a block diagram of an isolated-type AC-DC converter according to a second embodiment. In FIG. 3, the same symbols or reference numerals are used for units which are common to those in FIG. 1, and hereinafter, a difference therefrom will be mainly described.

The second embodiment is different from the first embodiment in that the diode 12B is not provided, and the diode 12A and the secondary coil 10B serve as a half-wave rectifier. That is, the diode 12A includes an anode connected to one terminal of the secondary coil 10B and a cathode connected to the first output node 11B. The second output node 11A is connected to the other terminal of the secondary coil 10B. The diode 12A and the output capacitor 13 function as the rectification smoothing circuit 70 which generates the output voltage VOUT by performing a half-wave rectification of a voltage of the secondary coil 10B and smoothing the rectified voltage.

As advantages of this configuration, an intermediate point of the secondary coil 10B is not required, and a configuration of the isolation transformer 10 is simplified. As a result, it is possible to minimize the device and to reduce manufacturing cost thereof.

In addition, there is also an advantage in that controllability can be increased by employing asymmetric control. Here, the asymmetric control is a method in which the output voltage VOUT is controlled by changing a ratio (switching duty) of ON-time of the high-side switching transistor 6 with respect to ON-time of the low-side switching transistor 5. As described in the first embodiment, in general, the ON-time of the high-side switching transistor 6 is the same as the ON-time of the low-side switching transistor 5, and output voltage VOUT is controlled by changing a switching frequency thereof (frequency control), in a resonance controlling method. In contrast, in the second embodiment, by using the half-wave rectifier, both frequency control and asymmetric control can be used, and a controllable range of the output voltage VOUT can be expanded.

Figure 4:
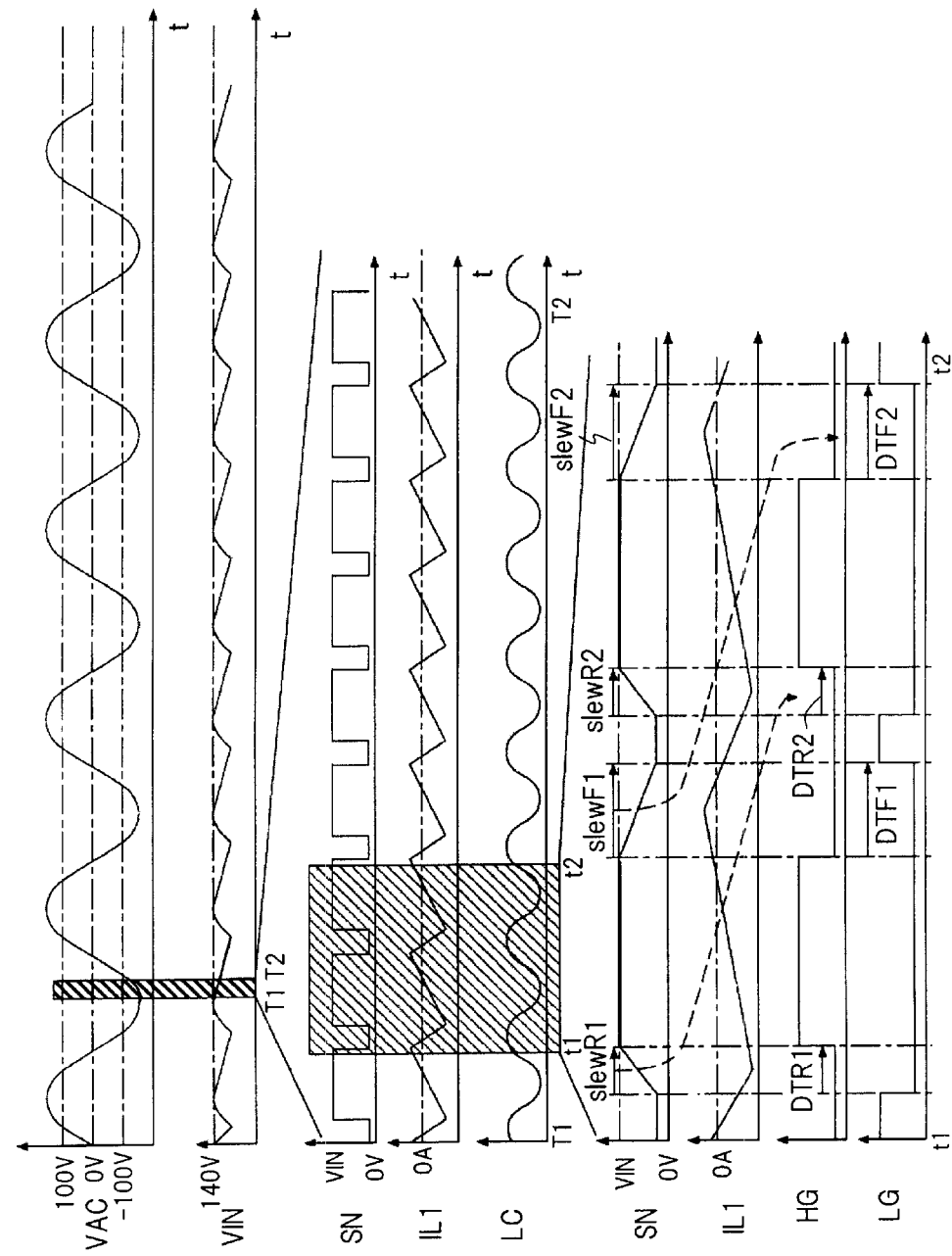
FIG. 4 is a waveform diagram of each signal generated in the isolated-type AC-DC converter in FIG. 3.

Meanwhile, by using the half-wave rectifier, a rising edge and a falling edge of the voltage SN of the switching node 4 are asymmetrical, as illustrated in FIG. 4. That is, rising voltage transition times slewR1 and slewR2 and falling voltage transition times slewF1 and slewF2 of the voltage SN are different from each other. A time difference therebetween becomes bigger, in a case where a load current increases, or a case where a switching duty increases. Furthermore, a rising edge and a falling edge of the current IL1 flowing through the primary coil 10A of the isolation transformer 10 become asymmetric by being affected by a current flowing through the half-wave rectifier.

In the present embodiment, a rising dead time DTR[n] from time when the low-side gate signal LG is changed to an inactive state to time when the high-side gate signal HG is changed to an active state, and a falling dead time DTF[n] from time when the high-side gate signal HG is changed to an inactive state to time when the low-side gate signal LG is changed to an active state are independently controlled.

Specifically, the control circuit 16 sets a rising voltage transition time slewR[n] (n is a positive integer) when the voltage SN of the switching node 4 is changed from a low voltage to a high voltage, as a rising dead time DTR[n+1] from time when the low-side gate signal LG is changed from an active state to an inactive state to time when the high-side gate signal HG is changed from an inactive state to an active state.

In addition, the control circuit 16 sets a falling voltage transition time slewF[n] when the voltage SN of the switching node 4 is changed from a high voltage to a low voltage, as a falling dead time DTF[n+1] from time when the high-side gate signal HG is changed from an active state to an inactive state to time when the low-side gate signal LG is changed from an inactive state to an active state.

Accordingly, even though the rising voltage transition time slewR[n] and the falling voltage transition time slewF[n] are independently changed by a change or the like of operation conditions, the high-side switching transistor 6 or the low-side switching transistor 5 can be turned on at an appropriate timing. Accordingly, it is possible to perform soft switching, regardless of the change or the like of operation conditions.

Hence, according to the second embodiment, it is possible to provide the isolated-type AC-DC converter and the isolated-type DC-DC converter 100 which are inexpensive, have wide allowable range of use conditions, and have high efficiency.

In the same manner as in the first embodiment, the rising dead time DTR[n] may be any time period according to the rising voltage transition time slewR[n], and may not be the same as the rising voltage transition time slewR[n]. This is the same as in a relationship between the falling dead time DTR[n] and the falling voltage transition time slewF[n].

Third Embodiment

A third embodiment relates to a specific configuration of the control circuit 16 according to the second embodiment.

Figure 5:
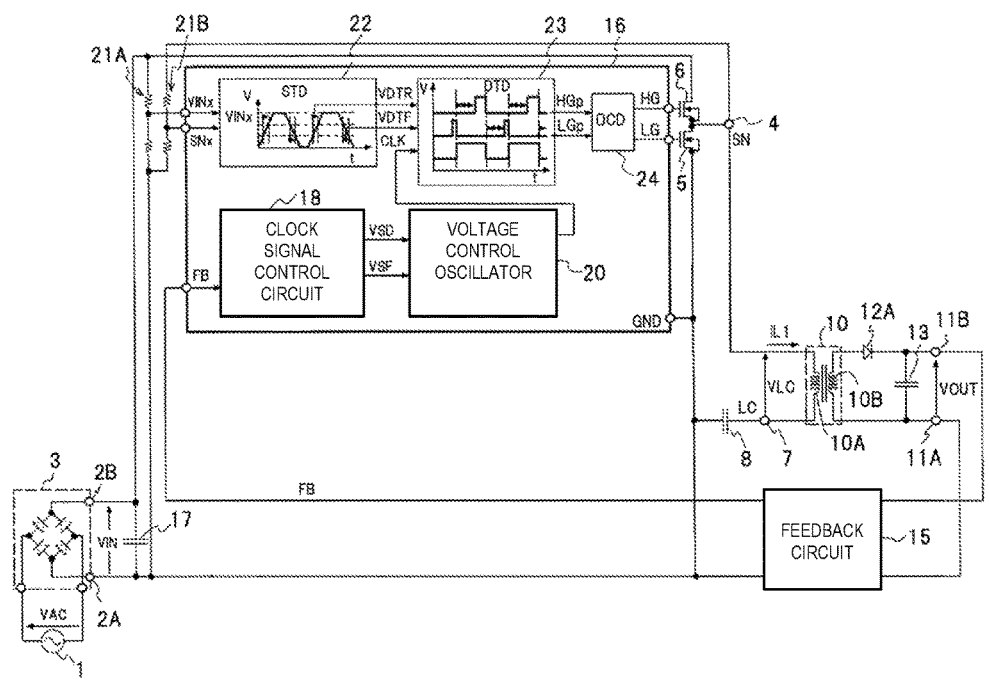
FIG. 5 is a block diagram of an isolated-type AC-DC converter according to a third embodiment.

FIG. 5 is a block diagram of an isolated-type AC-DC converter according to the third embodiment. In FIG. 5, the same symbols or reference numerals are used for units which are common to those in FIG. 3, and hereinafter, a difference therefrom will be mainly described.

The feedback circuit 15 receives the output voltage VOUT, and outputs the feedback signal FB (that is, negative feedback signal) which is a low voltage in a case where the output voltage VOUT is higher than a setting voltage, and is a high voltage in a case where the output voltage VOUT is lower than the setting voltage.

The control circuit 16 includes a clock signal control circuit 18, a voltage control oscillator (clock generation circuit) 20, a switching node transition time measurement circuit (measurement circuit) 22 (switching time detector: STD), a dead time delay circuit 23 (dead time delay: DTD), and a drive circuit 24 (off-chip driver: OCD).

The feedback signal FB is supplied to the clock signal control circuit 18. The clock signal control circuit 18 generates a switching frequency instruction signal VSF and a switching duty instruction signal VSD, based on the feedback signal FB.

For example, a voltage of the switching frequency instruction signal VSF is 1 V when a voltage of the feedback signal FB is higher than 4 V, is 2.5 V when the voltage of the feedback signal FB is lower than 2.5 V, and is converted to be a voltage denoted by "5 V–$V_{FB}$" when the voltage of the feedback signal FB is between 2.5 V and 4 V. $V_{FB}$ denotes the voltage of the feedback signal FB.

For example, a voltage of the switching duty instruction signal VSD is 4 V when a voltage of the feedback signal FB is lower than 1 V, is 2.5 V when the voltage of the feedback signal FB is higher than 2.5 V, and is converted to be a voltage denoted by "5 V–$V_{FB}$" when the voltage of the feedback signal FB is between 1 V and 2.5 V.

The voltage control oscillator 20 generates the clock signal CLK with a rectangular wave of which frequency and duty ratio are modulated, according to the switching frequency instruction signal VSF and the switching duty instruction signal VSD, respectively. The voltage control oscillator 20 generates a triangular wave which is changing between, for example, 1 V and 4 V. A slope of the triangular wave is controlled by the voltage of the switching frequency instruction signal VSF, whereby a frequency of the triangular wave is modulated. A voltage with the triangular wave is compared with a voltage of the switching duty instruction signal VSD, and the clock signal CLK is output which has a rectangular shape that goes to a low level when the voltage with the triangular wave is lower, and goes to a high level when the voltage with the triangular wave is higher. For example, a frequency of the clock signal CLK is 1 MHz when the switching frequency instruction signal VSF is 1 V, and is 2.5 MHz when the switching frequency instruction signal VSF is 2.5 V. In addition, for example, a duty ratio of the clock signal CLK is 50% when the switching duty instruction signal VSD is 2.5 V, and is 100% when the switching duty instruction signal VSD is 4 V.

In addition, as described in the second embodiment, the control circuit 16 has a function of detecting transition of the voltage SN of the switching node 4 and optimizing the dead time.

However, since the voltage SN of the switching node 4 is the same as the input voltage VIN which is obtained by rectifying the AC voltage VAC using the rectification circuit 3, that is, a high voltage of approximately 100 V to 400 V according to an amplitude of the AC voltage VAC, it is difficult to detect the voltage transition as it is. Hence, the voltage SN of the switching node 4 is divided into approximately one hundredth by a voltage divider 21B, and a switching node voltage SNx which is lowered to approximately 1 V to 4 V is input to the control circuit 16. In the same manner, the input voltage VIN is divided by a voltage divider 21A with the same division ratio, and the divided input voltage VINx is input to the control circuit 16.

The switching node transition time measurement circuit further divides the divided input voltage VINx, and generates a first voltage (VINx/3) which is one third of the divided input voltage VINx and a second voltage (2VINx/3) which is two thirds of the divided input voltage VINx.

The switching node transition time measurement circuit 22 compares the first voltage (VINx/3) and the second voltage (2VINx/3) with the divided switching node voltage SNx, thereby measuring first time which is changed between the first voltage (VINx/3) and the second voltage (2VINx/3). Hence, three times the first time is the voltage transition time of the switching node 4. By doing so, the switching node transition time measurement circuit 22 can measure the voltage transition time of the switching node 4.

Specifically, the switching node transition time measurement circuit 22 measures the first time in which the divided switching node voltage SNx increases from the first voltage (VINx/3) to the second voltage (2VINx/3), and generates a rising dead time setting voltage (first dead time setting voltage) VDTR proportional to the first time. In the same manner, the switching node transition time measurement circuit 22 generates a falling dead time setting voltage (second dead time setting voltage) VDTF proportional to the first time in which the divided switching node voltage SNx decreases from the second voltage (2VINx/3) to the first voltage (VINx/3).

The dead time delay circuit 23 generates a high-side timing signal HGp and a low-side timing signal LGp, in synchronization with the clock signal CLK which is generated by the voltage control oscillator 20.

At this time, the dead time delay circuit 23 sets three times the first time as the voltage transition time of the switching node 4, based on the rising dead time setting voltage VDTR and the falling dead time setting voltage VDTF, and sets the dead time according to the voltage transition time to time (that is, time between the high-side gate signal HG and the low-side gate signal LG) between the high-side timing signal HGp and the low-side timing signal LGp.

Specifically, the dead time delay circuit 23 sets a delay time proportional to the rising dead time setting voltage VDTR to time between a rising edge of the clock signal CLK and a rising edge of the high-side timing signal HGp. At this time, a falling edge of the low-side timing signal LGp is approximately the same as the rising edge of the clock signal CLK, and thus, the delay time becomes the rising dead time.

In the same manner, the dead time delay circuit 23 sets a delay time proportional to the falling dead time setting voltage VDTF to time between a falling edge of the clock signal CLK and a rising edge of the low-side timing signal LGp. At this time, a falling edge of the high-side timing signal HGp is approximately the same as the falling edge of the clock signal CLK, and thus, the delay time becomes the falling dead time.

The drive circuit 24 generates the low-side gate signal LG synchronous to the low-side timing signal LGp, and generates the high-side gate signal HG synchronous to the high-side timing signal HGp. The dead time between the high-side gate signal HG and the low-side gate signal LG is the same as the dead time between the high-side timing signal HGp and the low-side timing signal LGp. The drive circuit 24 drives the high-side switching transistor 6 using the high-side gate signal HG, and drives the low-side switching transistor 5 using the low-side gate signal LG.

The clock signal control circuit 18 controls the frequency and the duty ratio of the clock signal CLK, such that the output voltage VOUT approaches a predetermined setting voltage. In addition, the control circuit 16 stabilizes the output voltage VOUT to be a constant setting voltage by modulating a time ratio (switching duty) of a turn-on state with respect to a turn-off state of the low-side switching transistor 5 and the high-side switching transistor 6, and modulating a switching frequency.

Meanwhile, the low-side switching transistor 5 and the high-side switching transistor 6, which are driven by the drive circuit 24, are power transistors with high current driving power and a high breakdown voltage. Hence, the drive circuit 24 needs to have high current driving capability corresponding thereto, and in addition, need to have a voltage shift function, if necessary. As a result, delay time is generated between time when the low-side timing signal LGp or the high-side timing signal HGp is received and time when the low-side gate signal LG or the high-side gate signal HG starts to change.

Here, a method is considered in which dead time is provided by daring to break the driving power of the drive circuit or balance of the delay time, as a comparative example. However, the present embodiment does not need to do so. In the comparative example, if use conditions, such as the AC voltage VAC which is input, the input voltage VIN, or ambient temperature, are changed, abnormality such as deviation of dead time from an optimum value occurs many times, and efficiency decreases.

In contrast, according to the present embodiment, it is possible to set a stable dead time. Accordingly, it is possible to provide the isolated-type AC-DC converter and the isolated-type DC-DC converter 100 which have an allowable range of wide use conditions.

The first voltage and the second voltage are not limited to the aforementioned voltages. The first voltage may be lower than the divided input voltage VINx, and the second voltage may be lower than the divided input voltage VINx and higher than the first voltage. In this case, the dead time delay circuit 23 may multiply a first value obtained by dividing the divided input voltage by a difference between the second voltage and the first voltage, by first time, and may set the multiplied value to a voltage transition time.

In addition, the clock signal control circuit 18 may control at least one of the frequency and the duty ratio of the clock signal.

In addition, the control circuit 16 according to the first embodiment can also be configured in the same manner as the control circuit according to the present embodiment.

Fourth Embodiment

A fourth embodiment relates to a configuration of the switching node transition time measurement circuit 22.

Figure 6:
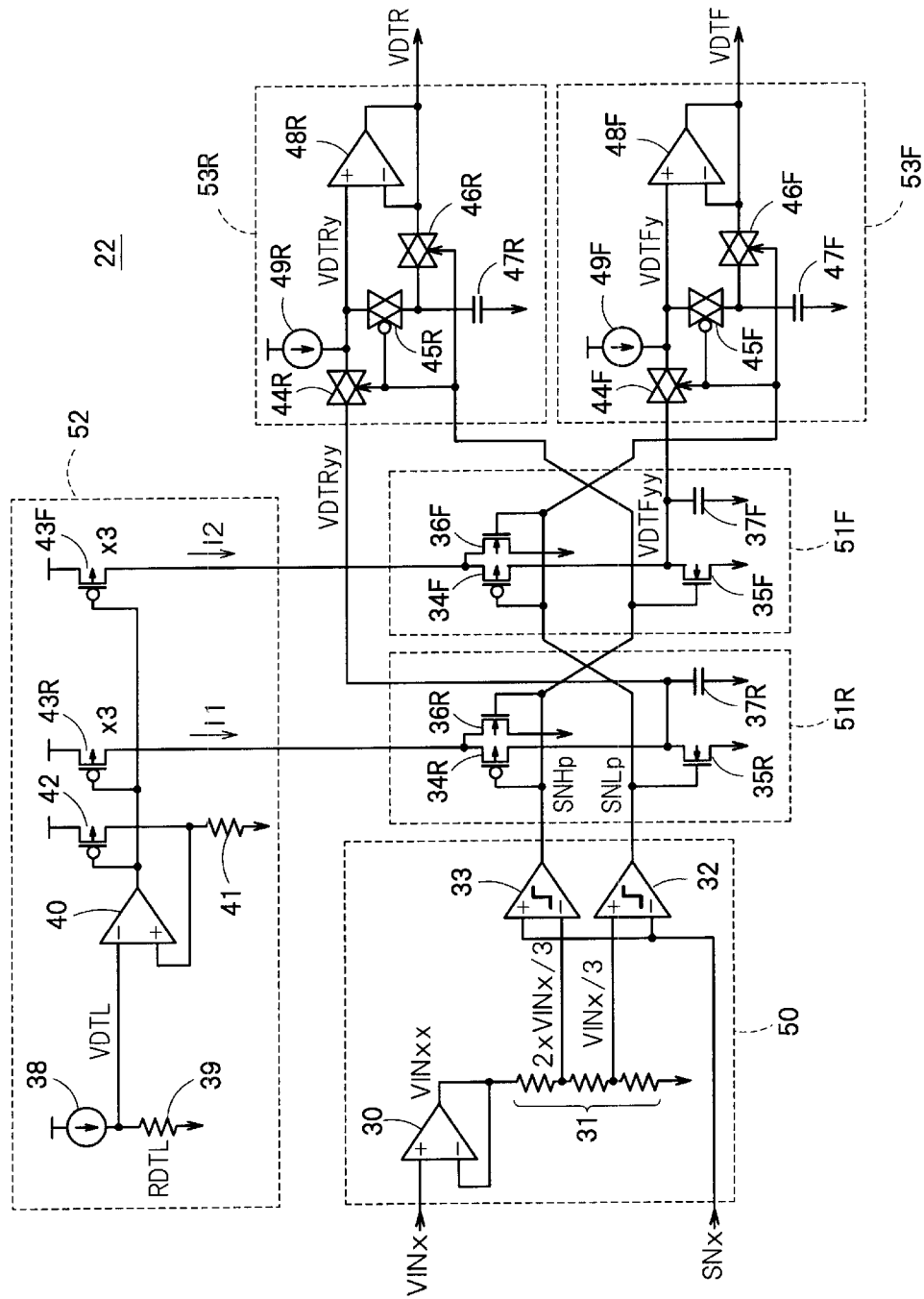
FIG. 6 is a circuit diagram of a switching node transition time measurement circuit according to a fourth embodiment.

FIG. 6 is a circuit diagram of the switching node transition time measurement circuit 22 according to the fourth embodiment. The switching node transition time measurement circuit 22 includes a switching node transition time measurement instrument (comparison circuit) 50, a switching node rising time and voltage converter (first charging circuit) 51R, a switching node falling time and voltage converter (second charging circuit) 51F, a longest dead time setting constant current source circuit 52, a first sample and hold circuit 53R, and a second sample and hold circuit 53F.

The switching node transition time measurement instrument 50 compares the divided switching node voltage SNx with the first voltage (VINx/3), and generates a timing signal SNLp, which is in a high state when the divided switching node voltage SNx is lower than the first voltage (VINx/3) and is in a low state when the divided switching node voltage SNx is equal to or higher than the first voltage (VINx/3).

In addition, the switching node transition time measurement instrument 50 compares the divided switching node voltage SNx with the second voltage (2VINx/3), and generates a timing signal SNHp, which is in a high state when the divided switching node voltage SNx is equal to or higher than the second voltage (2VINx/3) and is in a low state when the divided switching node voltage SNx is lower than the second voltage (2VINx/3).

The switching node transition time measurement instrument 50 includes a voltage follower 30, a voltage divider 31, a comparator 32, and a comparator 33.

The divided input voltage VINx is supplied to the voltage follower 30. The voltage follower 30 outputs an output voltage VINxx which is the same potential as the divided input voltage VINx.

The voltage divider 31 divides the output voltage VINxx, and generates the first voltage (VINx/3) and the second voltage (2VINx/3). The voltage divider 31 includes three resistors which have the same values with each other and are connected in series to each other.

The comparator 32 includes a non-inverting input terminal to which the first voltage (VINx/3) is supplied, and an inverting input terminal to which the divided switching node voltage SNx is supplied, and generates the timing signal SNLp.

In the same manner, the comparator 33 includes an inverting input terminal to which the second voltage (2VINx/3) is supplied, and a non-inverting input terminal to which the divided switching node voltage SNx is supplied, and generates the timing signal SNHp.

The switching node rising time and voltage converter 51R outputs a switching node rising transition time measurement voltage VDTRyy proportional to a time period between time when the timing signal SNLp is changed from a high state to a low state and time when the timing signal SNHp is changed from a low state to a high state.

In the same manner, the switching node falling time and voltage converter 51F outputs a switching node falling transition time measurement voltage VDTFyy proportional to a time period between time when the timing signal SNHp is changed from a high state to a low state and time when the timing signal SNLp is changed from a low state to a high state.

The switching node rising time and voltage converter 51R includes a PMOS transistor (second switch) 34R, an NMOS transistor (first switch) 35R, an NMOS transistor 36R, and a capacitor (first capacitor) 37R.

The PMOS transistor 34R includes a source (one terminal) to which a first constant current I1 is supplied from the longest dead time setting constant current source circuit 52, a drain (the other terminal) connected to one terminal of the capacitor 37R, and a gate to which the timing signal SNHp is supplied. The PMOS transistor 34R is turned on in a case where the timing signal SNHp is in a low state (in a case where the divided switching node voltage SNx is lower than the second voltage). The PMOS transistor 34R is turned off in a case where the timing signal SNHp is in a high state (in a case where the divided switching node voltage SNx is equal to or higher than the second voltage).

The NMOS transistor 35R is connected between both terminals of the capacitor 37R, and a gate thereof receives the timing signal SNLp. The NMOS transistor 35R is turned on in a case where the timing signal SNLp is in a high state (in a case where the divided switching node voltage SNx is lower than the first voltage), and discharges the capacitor 37R to 0 V. The NMOS transistor 35R is turned off in a case where the timing signal SNLp is in a low state (in a case where the divided switching node voltage SNx is equal to or higher than the first voltage).

The NMOS transistor 36R includes a drain connected to the source of the PMOS transistor 34R, a source which is connected to a ground, and a gate to which the timing signal SNHp is supplied.

A voltage of one terminal of the capacitor 37R is at the switching node rising transition time measurement voltage VDTRyy, and the other terminal of the capacitor 37R is connected to the ground.

The switching node rising time and voltage converter 51R charges the capacitor 37R using the first constant current I1 during a time period in which the divided switching node voltage SNx is equal to or higher than the first voltage and is lower than the second voltage.

The switching node falling time and voltage converter 51F includes a PMOS transistor (fourth switch) 34F, an NMOS transistor (third switch) 35F, an NMOS transistor 36F, and a capacitor (second capacitor) 37F.

The PMOS transistor 34F includes a source (one terminal) to which a second constant current I2 is supplied from the longest dead time setting constant current source circuit 52, a drain (the other terminal) connected to one terminal of the capacitor 37F, and a gate to which the timing signal SNLp is supplied. The PMOS transistor 34F is turned on in a case where the timing signal SNLp is in a low state (in a case where the divided switching node voltage SNx is equal to or higher than the first voltage). The PMOS transistor 34F is turned off in a case where the timing signal SNLp is in a high state (in a case where the divided switching node voltage SNx is lower than the first voltage).

The NMOS transistor 35F is connected between both terminals of the capacitor 37F, and a gate terminal thereof receives the timing signal SNHp. The NMOS transistor 35F is turned on in a case where the timing signal SNHp is in a high state (in a case where the divided switching node voltage SNx is equal to or higher than the second voltage), and discharges the capacitor 37F to 0 V. The NMOS transistor 35F is turned off in a case where the timing signal SNHp is in a low state (in a case where the divided switching node voltage SNx is lower than the second voltage).

The NMOS transistor 36F includes a drain connected to the source of the PMOS transistor 34F, a source connected to the ground, and a gate to which the timing signal SNLp is supplied.

A voltage of one terminal of the capacitor 37F is at the switching node falling transition time measurement voltage VDTFyy, and the other terminal of the capacitor 37F is connected to the ground.

The switching node falling time and voltage converter 51F charges the capacitor 37F using the second constant current I2 during a time period in which the divided switching node voltage SNx is equal to or higher than the first voltage and is lower than the second voltage.

The longest dead time setting constant current source circuit 52 outputs the first constant current I1 and the second constant current I2 which are proportional to a resistance value RDTL of a longest dead time setting resistor 39. A value of the first constant current I1 is equal to a value of the second constant current I2. The longest dead time setting constant current source circuit 52 includes a constant current source 38, the longest dead time setting resistor 39, a differential amplifier 40, a resistor 41, and PMOS transistors 42, 43R, and 43F.

The constant current source 38 generates a longest dead time setting voltage VDTL by making a constant current of 10 μA flow through the longest dead time setting resistor 39. A longest dead time will be described in a fifth embodiment.

The differential amplifier 40 applies a voltage equal to the longest dead time setting voltage VDTL to the resistor 41. At this time, a current flowing through the resistor 41 is amplified by three times by a current mirror circuit including the PMOS transistors 42, 43R, and 43F, and the first constant current I1 and the second constant current I2 are output from the current mirror circuit. The PMOS transistor 43R functions as a first current source which outputs the first constant current I1. The PMOS transistor 43F functions as a second current source which outputs the second constant current I2.

For example, in order for the longest dead time to be set to a long time of 100 ns, the resistance value RDTL of the longest dead time setting resistor 39 is set to 40 kΩ (first condition), and in order for the longest dead time to be set to a short time of 10 ns, the resistance value RDTL is set to 400 kΩ (second condition). If a constant current of 10 µA flows through the longest dead time setting resistor 39, the longest dead time setting voltage VDTL becomes 400 mV at the first condition, and becomes 4 V at the second condition.

When the voltage VDTL is applied to the resistor 41 of 40 kΩ, a current flowing through the resistor is 10 µA at the first condition, and is 100 µA at the second condition. The current is amplified by three times by the current mirror circuit (PMOS transistors 42, 43R, and 43F), the first and second constant currents I1 and I2 are set to 30 µA at the first condition, and set to 300 µA at the second condition.

If capacitances of the capacitors 37R and 37F are set to 1 pF, and the capacitors 37R and 37F are respectively charged by the first and second constant currents I1 and I2 of 30 µA for the time period that is equal to one third of the longest dead time when the longest dead time is set to 100 ns, the voltage becomes 1 V. If the voltage transition time of the switching node 4 is 50 ns of a half thereof, the capacitors are charged to 0.5 V, and if the voltage transition time is 10 ns of 10%, the capacitors are charged to 0.1 V.

In the same manner, if the capacitors 37R and 37F of 1 pF are respectively charged by the first and second constant currents I1 and I2 of 300 µA for the time of one third of the longest dead time of 10 ns when the longest dead time is set to 10 ns, voltages of the capacitors become 1V. If the voltage transition time of the switching node 4 is 5 ns (half of 10 ns), the capacitors are charged to 0.5 V. If the voltage transition time is 1 ns (10% of 10 ns), the capacitors are charged to 0.1 V. Accordingly, a voltage according to a ratio of the voltage transition time of the switching node 4 to the set longest dead time appears in the capacitors 37R and 37F.

In a case where the divided switching node voltage SNx is equal to or higher than the second voltage, the first sample and hold circuit 53R samples a voltage charged in the capacitor 37R, and in a case where the divided switching node voltage SNx is lower than the second voltage, the first sample and hold circuit 53R holds the sampled voltage, and outputs the sampled voltage as the rising dead time setting voltage VDTR.

In a case where the divided switching node voltage SNx is lower than the first voltage, the second sample and hold circuit 53F samples a voltage charged in the capacitor 37F, and in a case where the divided switching node voltage SNx is equal to or higher than the first voltage, the second sample and hold circuit 53F holds the sampled voltage, and outputs the sampled voltage as the falling dead time setting voltage VDTF.

The first sample and hold circuit 53R includes transfer gates 44R, 45R, and 46R, an output differential amplifier 48R, a hold capacitor 47R, and an initialization constant current source 49R.

The second sample and hold circuit 53F includes transfer gates 44F, 45F, and 46F, an output differential amplifier 48F, a hold capacitor 47F, and an initialization constant current source 49F.

Figure 7:
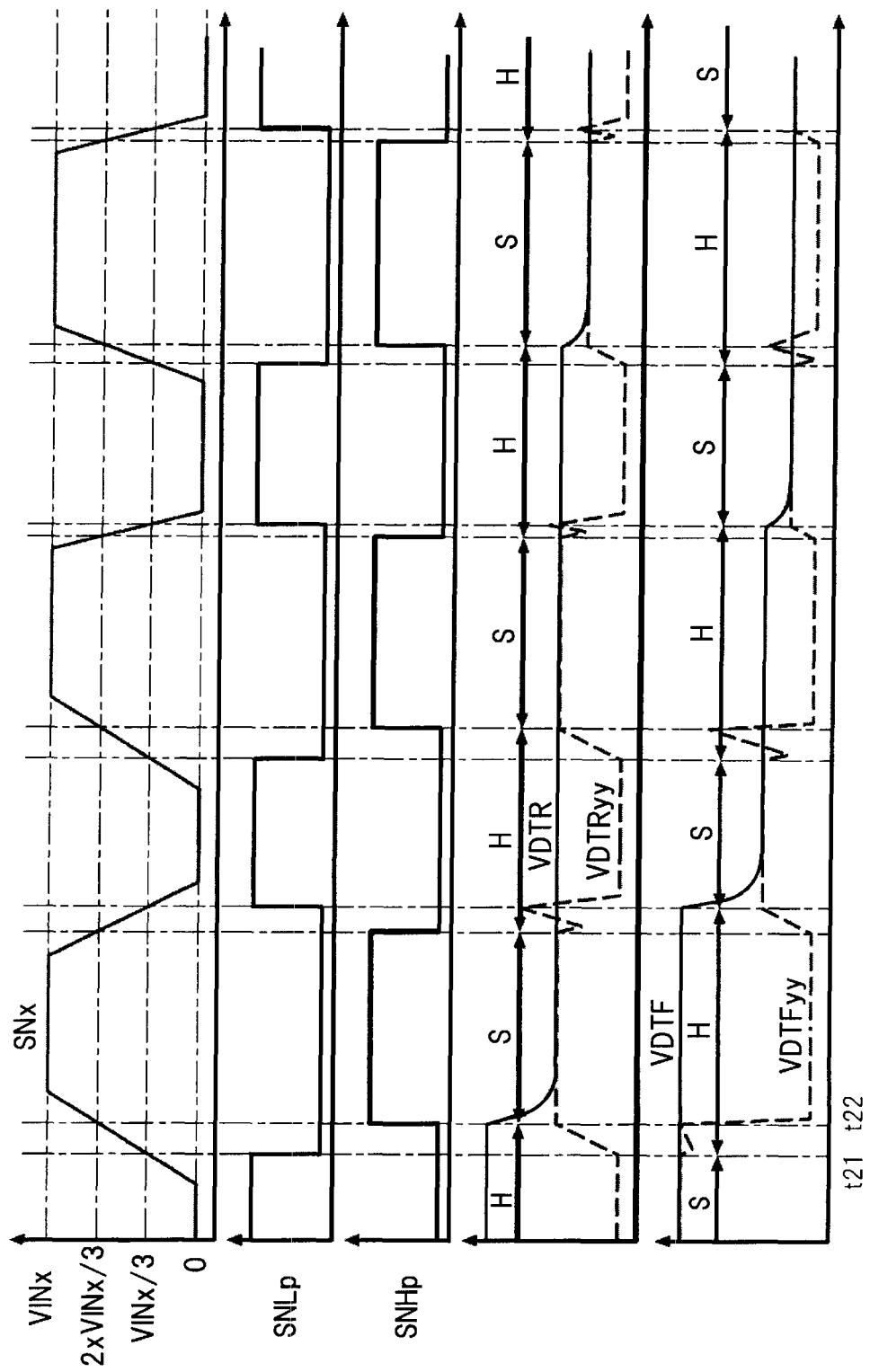
FIG. 7 is a waveform diagram of each signal generated in the switching node transition time measurement circuit in FIG. 6.

An internal operation of the switching node transition time measurement circuit 22 will be described with reference to FIG. 7. FIG. 7 is a waveform diagram of each signal generated in the switching node transition time measurement circuit 22 in FIG. 6.

As illustrated in FIG. 7, the divided switching node voltage SNx increases to the divided input voltage VINx from 0 V at a slow speed. Thereafter, the divided switching node voltage SNx decreases to 0 V again at a slightly faster speed than the rising speed. FIG. 7 illustrates three trapezoidal waveforms which are changed between 0 V and the divided input voltage VINx in such a way. The rising speed and the falling speed of the trapezoidal waveform are affected by the magnitude of a resonance current flowing through the primary coil 10A of the isolation transformer 10, and become faster as the number of switching increases, in this example.

FIG. 7 illustrates the timing signal SNLp, the timing signal SNHp, the switching node rising transition time measurement voltage VDTRyy (dashed line), the rising dead time setting voltage VDTR (solid line), the switching node falling transition time measurement voltage VDTFyy (dashed line), and the falling dead time setting voltage VDTF (solid line).

In addition, a sampling operation period S and a hold operation period H of the first sample and hold circuit 53R and the second sample and hold circuit 53F are illustrated.

The divided switching node voltage SNx is 0 V in an initial state. As a result, the timing signal SNLp is in a high state, and the timing signal SNHp is in a low state.

The switching node rising time and voltage converter 51R, receiving the timing signal SNLp in a high state, turns on the NMOS transistor 35R, discharges the capacitor 37R, maintains the switching node rising transition time measurement voltage VDTRyy to be at 0 V. However, the first sample and hold circuit 53R in a subsequent stage, receiving the timing signal SNHp in a low state, turns off the transfer gate 44R configuring the first sample and hold circuit, turns on the transfer gate 45R, and turns off the transfer gate 46R. Accordingly, the first sample and hold circuit 53R becomes a hold state, thereby not taking in the switching node rising transition time measurement voltage VDTRyy, and the output differential amplifier 48R continuously outputs a previous voltage accumulated in the hold capacitor 47R as the rising dead time setting voltage VDTR. Here, in a case where the switching operation is maintained in a stopped state before this operation is performed, the hold capacitor 47R is charged with a high potential by a small current of 50 nA from the initialization constant current source 49R through the transfer gate 45R, and eventually, the rising dead time setting voltage VDTR becomes a high voltage. That is, an initial rising dead time becomes the longest time.

Meanwhile, the switching node falling time and voltage converter 51F, receiving the timing signal SNLp, turns on the NMOS transistor 36F, maintains a constant current source node to be at 0 V, and turns off the PMOS transistor 34F. In addition, as the NMOS transistor 35F receiving the timing signal SNHp is turned off, the switching node falling transition time measurement voltage VDTFyy of the capacitor 37F enters a floating state.

Here, the second sample and hold circuit 53F in a subsequent stage, receiving the timing signal SNLp in a high state, turns on the transfer gate 44F configuring the second sample and hold circuit, turns off the transfer gate 45F, and turns on the transfer gate 46F. Accordingly, the second sample and hold circuit 53F enters a sampling state, thereby taking in the switching node falling transition time measurement voltage VDTFyy, the output differential amplifier 48F outputs the switching node falling transition time measurement voltage VDTFyy as the falling dead time setting voltage VDTF, and simultaneously, charges the hold capacitor 47F with the switching node falling transition time measurement voltage VDTFyy through the transfer gate 46F.

Here, in a case where the switching operation is maintained in a stopped state before this operation is performed, the hold capacitor 47F is charged with a high voltage by a small current of 50 nA from the initialization constant current source 49F through the transfer gate 44F, and the switching node falling transition time measurement voltage VDTFyy and the falling dead time setting voltage VDTF become a high voltage together. That is, an initial falling dead time becomes the longest time.

The timing signal SNLp enters a low state from the moment (point of time t21) when the divided switching node voltage SNx starts to increase according to the switching operation and is higher than a first voltage which is one third of the divided input voltage VINx. The switching node rising time and voltage converter 51R receives the timing signal SNLp, the NMOS transistor 35R is turned off, the capacitor 37R is charged by the first constant current I1 from the longest dead time setting constant current source circuit 52 through the PMOS transistor 34R, and thus, the switching node rising transition time measurement voltage VDTRyy increases. However, the first sample and hold circuit 53R in a subsequent stage is maintained in the hold state, and thus, the rising dead time setting voltage VDTR which is output thereof is held in a previous state.

Meanwhile, the switching node falling time and voltage converter 51F, receiving the timing signal SNLp in a low state, turns on the PMOS transistor 34F thereof, and turns off the NMOS transistor 36F. The capacitor 37F is charged, and the switching node falling transition time measurement voltage VDTFyy varies. However, in the same time as this, the second sample and hold circuit 53F in a subsequent stage enters the hold state, thereby not taking in the switching node falling transition time measurement voltage VDTFyy, and continuously outputting a voltage accumulated in the hold capacitor 47F as the falling dead time setting voltage VDTF.

Furthermore, the timing signal SNHp enters a high state from the moment (point of time t22) when the divided switching node voltage SNx starts to increase and becomes higher than a second voltage which is two thirds of the divided input voltage VINx. The switching node rising time and voltage converter 51R receives the divided switching node voltage SNx, whereby the PMOS transistor 34R is turned off, and charging of the capacitor 37R ends. By this operation, the switching node rising transition time measurement voltage VDTRyy becomes a voltage proportional to the voltage transition time of the switching node 4. At the same time, the NMOS transistor 36R is turned on, noise in the longest dead time setting constant current source circuit 52 due to a sudden change of a state is reduced. In the same time as this, the first sample and hold circuit 53R in a subsequent stage becomes a sample state, thereby taking in the switching node rising transition time measurement voltage VDTRyy, charging the hold capacitor 47R with the voltage, and outputting the voltage as the rising dead time setting voltage VDTR.

Meanwhile, the switching node falling time and voltage converter 51F, receiving the timing signal SNHp in a high state, turns on the NMOS transistor 35F, discharges the capacitor 37F, and initializes the switching node falling transition time measurement voltage VDTFyy to be 0 V. However, the second sample and hold circuit 53F in a subsequent stage maintains the hold state, the falling dead time setting voltage VDTF is held to be at a previous voltage.

Thereafter, the divided switching node voltage SNx decreases according to the switching operation. The other operation is the same as the aforementioned operation, and thus, detailed description thereof will be omitted.

In this way, according to the present embodiment, it is possible to obtain the rising dead time setting voltage VDTR and the falling dead time setting voltage VDTF which are proportional to the voltage transition time of the switching node 4, with respect to each of rising and falling of the voltage SN. In addition, since symmetricity of a circuit increases, error is less likely to occur in the measurement value of the rising time and the falling time.

In addition, change time of the voltage SN of the switching node 4 between the first voltage which is one third of the input voltage VIN and the second voltage which is two thirds thereof is measured. For that reason, the circuit is not affected by the delay occurring in the drive circuit 24, the low-side and high-side switching transistors 5 and 6, or the like, and has high accuracy.

In addition, the longest dead time can be set, the rising and falling dead time setting voltages VDTR and VDTF according to a ratio of the voltage transition time of the switching node 4 to the longest dead time can be obtained. As a result, it is possible to adjust measurement accuracy in accordance with use conditions.

That is, according to the present embodiment, it is possible to provide the isolated-type AC-DC converter and the isolated-type DC-DC converter 100 which stably operate in wide use conditions, such as an input voltage range or an ambient temperature.

Fifth Embodiment

A fifth embodiment relates to a detailed configuration of the dead time delay circuit 23.

As described above, the dead time delay circuit 23 is a buffer circuit that receives the clock signal CLK of which frequency and duty ratio are modulated, according to a voltage of the feedback signal FB, and outputs the high-side timing signal HGp in a common mode therewith and the low-side timing signal LGp in a reverse mode therewith. At this time, delay time according to the rising dead time setting voltage VDTR is set in a rising edge of the high-side timing signal HGp, and delay time according to the falling dead time setting voltage VDTF is set in a rising edge of the low-side timing signal LGp.

Figure 8:
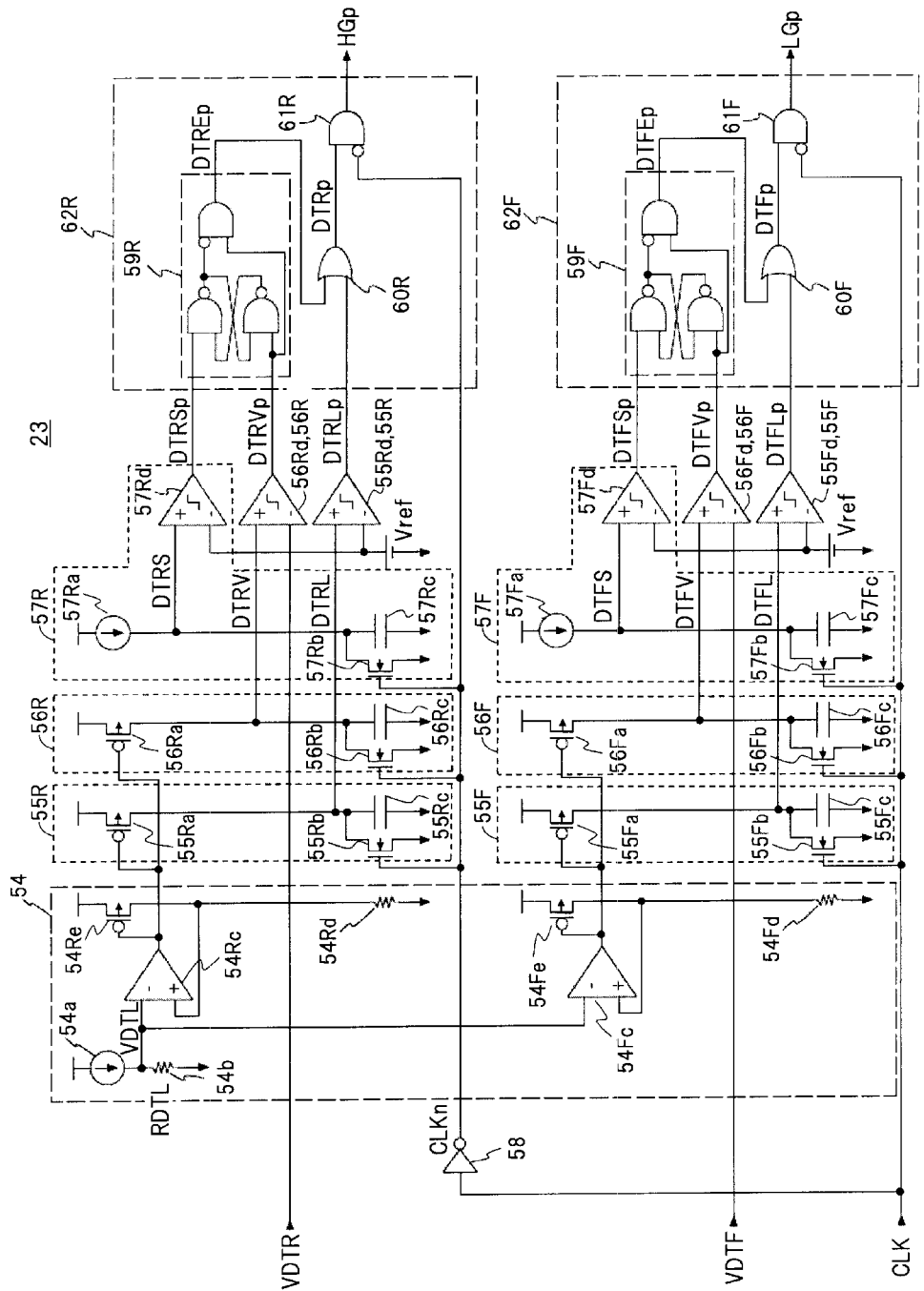
FIG. 8 is a circuit diagram of a dead time delay circuit according to a fifth embodiment.

FIG. 8 is a circuit diagram of the dead time delay circuit 23 according to the fifth embodiment. The dead time delay circuit 23 includes a longest dead time setting constant current source 54, a rising longest dead time delay circuit (first longest dead time delay circuit) 55R, a falling longest dead time delay circuit (second longest dead time delay circuit) 55F, a rising variable dead time delay circuit (first variable dead time delay circuit) 56R, a falling variable dead time delay circuit (second variable dead time delay circuit) 56F, a rising shortest dead time delay circuit (first shortest dead time delay circuit) 57R, a falling shortest dead time delay circuit (second shortest dead time delay circuit) 57F, an inverter 58, a rising dead time delay arbiter (first arbiter) 62R, and a falling dead time delay arbiter (second arbiter) 62F.

The longest dead time setting constant current source 54 includes, for example, a constant current source 54a of 10

µA, a resistor 54b, differential amplifiers 54Rc and 54Fc, resistors 54Rd and 54Fd, and PMOS transistors 54Re and 54Fe.

The rising longest dead time delay circuit 55R enters an active state by delaying predetermined longest dead time (for example, 100 ns) from a rising edge of the clock signal CLK, and generates a rising longest dead time delay signal (first longest dead time delay signal) DTRLp which enters an inactive state in synchronization with a falling edge of the clock signal CLK.

The rising variable dead time delay circuit 56R enters an active state after a dead time corresponding to the rising dead time setting voltage VDTR from the rising edge of the clock signal CLK, and generates a rising variable dead time delay signal (first variable dead time delay signal) DTRVp which enters an inactive state in synchronization with a falling edge of the clock signal CLK.

The rising shortest dead time delay circuit 57R enters an active state by delaying predetermined shortest dead time (for example, 10 ns) from the rising edge of the clock signal CLK, and generates a rising shortest dead time delay signal (first shortest dead time delay signal) DTRSp which enters an inactive state in synchronization with a falling edge of the clock signal CLK.

The rising dead time delay arbiter 62R outputs the high-side timing signal HGp synchronous to the rising variable dead time delay signal DTRVp or the rising longest dead time delay signal DTRLp, based on timing when the rising variable dead time delay signal DTRVp enters an active state.

The falling longest dead time delay circuit 55F enters an active state after the longest dead time (for example, 100 ns) from a falling edge of the clock signal CLK, and generates a falling longest dead time delay signal (second longest dead time delay signal) DTFLp which enters an inactive state in synchronization with a rising edge of the clock signal CLK.

The falling variable dead time delay circuit 56F enters an active state after a dead time corresponding to the falling dead time setting voltage VDTF from the falling edge of the clock signal CLK, and generates a falling variable dead time delay signal (second variable dead time delay signal) DTFVp which enters an inactive state in synchronization with a rising edge of the clock signal CLK.

The falling shortest dead time delay circuit 57F enters an active state after a shortest dead time (for example, 10 ns) from the falling edge of the clock signal CLK, and generates a falling shortest dead time delay signal (second shortest dead time delay signal) DTFSp which enters an inactive state in synchronization with a rising edge of the clock signal CLK.

The falling dead time delay arbiter 62F outputs the low-side timing signal LGp synchronous to the falling variable dead time delay signal DTFVp or the falling longest dead time delay signal DTFLp, based on timing when the falling variable dead time delay signal DTFVp enters an active state.

The rising longest dead time delay circuit 55R includes a PMOS transistor 55Ra, an NMOS transistor 55Rb, a capacitor 55Rc, and a comparator 55Rd.

The PMOS transistor 55Ra outputs a constant current. The capacitor 55Rc includes one terminal which is connected to a drain of the PMOS transistor 55Ra and to which the constant current is supplied, and the other terminal connected to the ground.

The NMOS transistor 55Rb is connected between both terminals of the capacitor 55Rc, and includes a gate to which an inverting signal CLKn of the clock signal CLK is supplied.

The comparator 55Rd compares a reference voltage Vref of, for example, 1 V with a voltage DTRL of the capacitor 55Rc, and outputs the comparison results as the rising longest dead time delay signal DTRLp.

The falling longest dead time delay circuit 55F includes a PMOS transistor 55Fa, an NMOS transistor 55Fb, a capacitor 55Fc, and a comparator 55Fd.

The PMOS transistor 55Fa outputs a constant current. The capacitor 55Fc includes one terminal which is connected to a drain of the PMOS transistor 55Fa and to which the constant current is supplied, and the other terminal connected to the ground.

The NMOS transistor 55Fb is connected between both terminals of the capacitor 55Fc, and includes a gate to which the clock signal CLK is supplied.

The comparator 55Fd compares the reference voltage Vref with a voltage DTFL of the capacitor 55Fc, and outputs the comparison results as the falling longest dead time delay signal DTFLp.

The rising variable dead time delay circuit 56R includes a PMOS transistor (third constant current source) 56Ra, an NMOS transistor (third switch) 56Rb, a capacitor (third capacitor) 56Rc, and a comparator (first comparator) 56Rd.

The PMOS transistor 56Ra outputs a third constant current. The capacitor 56Rc includes one terminal which is connected to a drain of the PMOS transistor 56Ra and to which the third constant current is supplied, and the other terminal connected to the ground.

The NMOS transistor 56Rb is connected between both terminals of the capacitor 56Rc, includes a gate to which the inverting signal CLKn of the clock signal CLK is supplied, is turned on when the clock signal CLK is in a low state, and is turned off when the clock signal CLK is in a high state.

The comparator 56Rd compares the rising dead time setting voltage VDTR with a voltage DTRV of the capacitor 56Rc, and outputs the comparison results as the rising variable dead time delay signal DTRVp.

The falling variable dead time delay circuit 56F includes a PMOS transistor (fourth constant current source) 56Fa, an NMOS transistor (fourth switch) 56Fb, a capacitor (fourth capacitor) 56Fc, and a comparator (second compactor) 56Fd.

The PMOS transistor 56Fa outputs a fourth constant current. The capacitor 56Fc includes one terminal which is connected to a drain of the PMOS transistor 56Fa and to which the fourth constant current is supplied, and the other terminal connected to the ground. A value of the fourth constant current is the same as a value of the third constant current and values of the constant currents of the PMOS transistors 55Ra and 55Fa.

The NMOS transistor 56Fb is connected between both terminals of the capacitor 56Fc, and includes a gate to which the clock signal CLK is supplied, is turned on when the clock signal CLK is in a high state, and turned off when the clock signal CLK is in a low state.

The comparator 56Fd compares the falling dead time setting voltage VDTF with a voltage DTFV of the capacitor 56Fc, and outputs the comparison results as the falling variable dead time delay signal DTFVp.

A value of the first constant current I1 flowing in the switching node transition time measurement circuit 22 described in the second embodiment is three times (first multiple) the value of the third constant current.

The rising shortest dead time delay circuit 57R includes a constant current source 57Ra, an NMOS transistor 57Rb, a capacitor 57Rc, and a comparator 57Rd.

The capacitor 57Rc includes one terminal to which a constant current is supplied from the constant current source 57Ra, and the other terminal connected to the ground.

The NMOS transistor 57Rb is connected between both terminals of the capacitor 57Rc, and includes a gate to which the inverting signal CLKn of the clock signal CLK is supplied.

The comparator 57Rd compares the reference voltage Vref with a voltage DTRS of the capacitor 57Rc, and outputs the comparison results as the rising shortest dead time delay signal DTRSp.

The falling shortest dead time delay circuit 57F includes a constant current source 57Fa, an NMOS transistor 57Fb, a capacitor 57Fc, and a comparator 57Fd.

The capacitor 57Fc includes one terminal to which a constant current is supplied from the constant current source 57Fa, and the other terminal connected to the ground. A value of the constant current source of the constant current source 57Fa is equal to a value of the constant current of the constant current source 57Ra, and is greater than a value of the third constant current.

The NMOS transistor 57Fb is connected between both terminals of the capacitor 57Fc, and includes a gate to which the clock signal CLK is supplied.

The comparator 57Fd compares the reference voltage Vref with a voltage DTFS of the capacitor 57Fc, and outputs the comparison results as the falling shortest dead time delay signal DTFSp.

The rising dead time delay arbiter 62R includes a shortest dead time limiter 59R, a longest dead time limiter 60R, and a down edge trimming gate 61R.

The rising dead time delay arbiter 62R outputs the high-side timing signal HGp synchronous to the rising longest dead time delay signal DTRLp, in a case where timing when the rising variable dead time delay signal DTRVp enters an active state is earlier than timing when the rising shortest dead time delay signal DTRSp enters an active state, and in a case where timing when the rising variable dead time delay signal DTRVp enters an active state is later than timing when the rising longest dead time delay signal DTRLp enters an active state.

The falling dead time delay arbiter 62F includes a shortest dead time limiter 59F, a longest dead time limiter 60F, and a down edge trimming gate 61F.

The falling dead time delay arbiter 62F outputs the low-side timing signal LGp synchronous to the falling longest dead time delay signal DTFLp, in a case where timing when the falling variable dead time delay signal DTFVp enters an active state is earlier than timing when the falling shortest dead time delay signal DTFSp enters an active state, and in a case where timing when the falling variable dead time delay signal DTFVp enters an active state is later than timing when the falling longest dead time delay signal DTFLp enters an active state.

Figure 9:
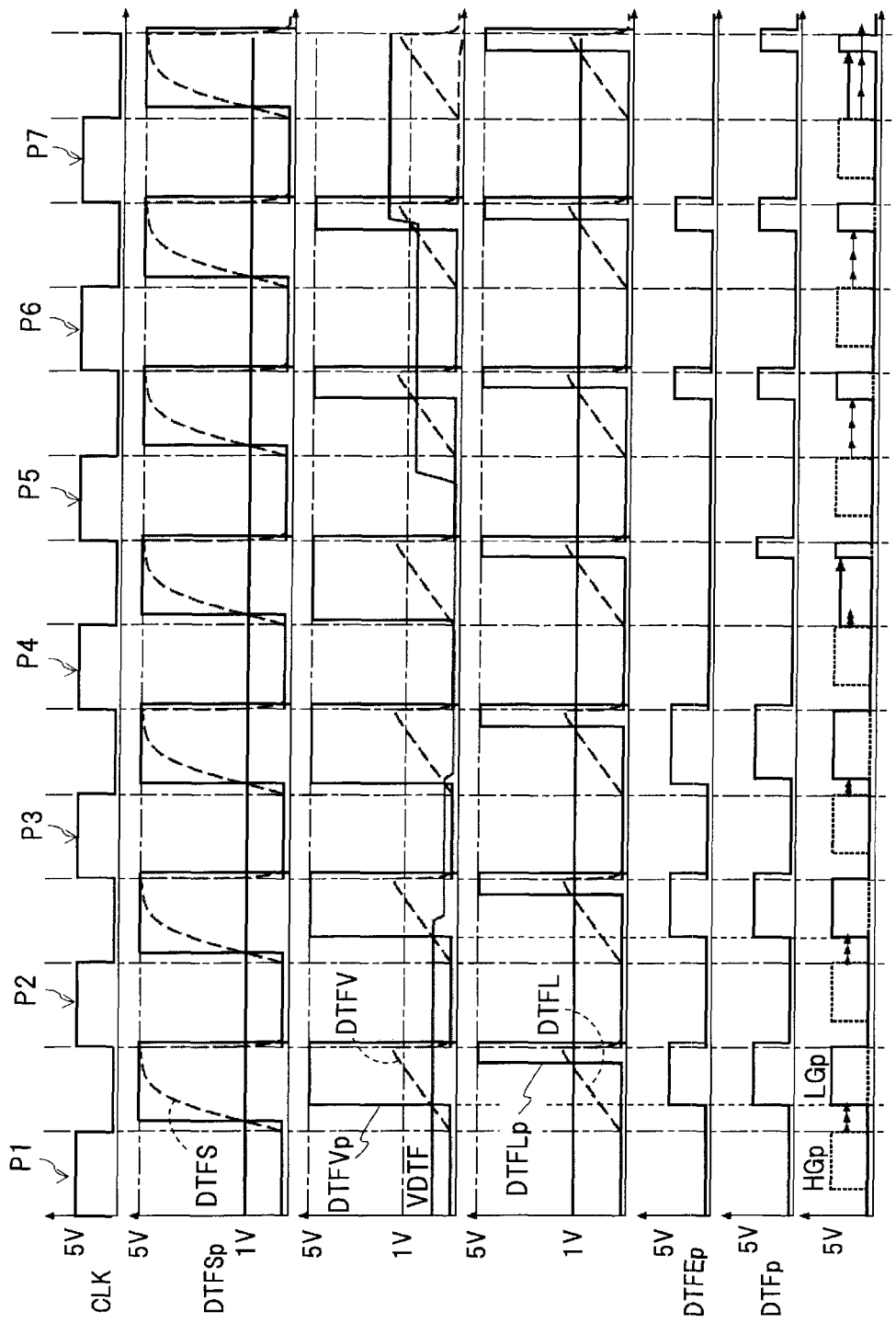
FIG. 9 is a waveform diagram of each signal generated in the dead time delay circuit in FIG. 8.

FIG. 9 is a waveform diagram of each signal generated in the dead time delay circuit 23 in FIG. 8. The clock signal CLK which is input to the dead time delay circuit 23 is illustrated on a top row in FIG. 9.

The voltage DTFS (dashed line) of the capacitor 57Fc of the falling shortest dead time delay circuit 57F, the reference voltage Vref of 1 V which is compared with the voltage DTFS, and the falling shortest dead time delay signal DTFSp (solid line), which is an output signal of the comparator 57Fd, are illustrated in a second row of FIG. 9.

The voltage DTFV (dashed line) of the capacitor 56Fc of the falling variable dead time delay circuit 56F, the falling dead time setting voltage VDTF (solid line) which is compared with the voltage DTFV, and the falling variable dead time delay signal DTFVp (solid line), which is an output signal of the comparator 56Fd, are illustrated in a third row of FIG. 9.

The voltage DTFL (dashed line) of the capacitor 55Fc of the falling longest dead time delay circuit 55F, the reference voltage Vref of 1 V which is compared with the voltage DTFL, and the falling longest dead time delay signal DTFLp (solid line), which is an output signal of the comparator 55Fd, are illustrated in a fourth row of FIG. 9.

Here, since the NMOS transistors 57Fb, 56Fb, and 55Fb are turned on when the clock signal CLK enters a high state, the voltages DTFS, DTFV, and DTFL of the three capacitors, 57Fc, 56Fc, and 55Fc are maintained at 0 V. Meanwhile, if the clock signal CLK enters a low state, the capacitors respectively start to be charged by the constant currents from the constant current source 57Fa and the PMOS transistors 56Fa and 55Fa, and the voltages DTFS, DTFV, and DTFL increase.

An increasing speed of the voltage DTFS of the falling shortest dead time delay circuit 57F is 0.1 V/ns, if the capacitor 57F of, for example, 1 pF is charged with the constant current of 100 μA. When the voltage DTFS is higher than the reference voltage Vref of 1 V, the falling shortest dead time delay signal DTFSp enters a high state. That is, the falling shortest dead time delay signal DTFSp is a delay signal which enters a high state after 10 ns (shortest dead time) passes from the time when the clock signal CLK enters a low state.

Meanwhile, increasing speeds of the voltage DTFV of the falling variable dead time delay circuit 56F and the voltage DTFL of the falling longest dead time delay circuit 55F are both set by the longest dead time setting constant current source 54. The setting is the same as in the longest dead time setting constant current source circuit 52 according to the fourth embodiment. For example, if a resistance value RDTL of the longest dead time setting resistor 54b is set to 40 kΩ and a constant current of 10 μA flows through the resistor 54b from the constant current source 54a, the longest dead time setting voltage VDTL becomes 0.4 V. The resistance value RDTL of the longest dead time setting resistor 54b is equal to the resistance value RDTL of the longest dead time setting resistor 39 of the switching node transition time measurement circuit 22. A voltage having the same magnitude as the longest dead time setting voltage VDTL (=0.4 V) thereof is applied to the resistor 54Fd (=40 kΩ) by the differential amplifier 54Fc. At this time, a current flowing through the resistor 54Fd is 10 μA. This current is mirrored by the PMOS transistors 54Fe, 55Fa, and 56Fa, and the capacitor 55Fc and the capacitor 56Fc, each being 1 pF, are charged by the constant current of 10 μA.

Hence, if the resistance value RDTL of the longest dead time setting resistor 54b is set to 40 kΩ, increasing speeds of the voltage DTFV of the falling variable dead time delay circuit 56F and the voltage DTFL of the falling longest dead time delay circuit 55F are 0.01 V/ns, and the longest dead time until reaching the reference voltage Vref of 1 V is 100 ns. In the same manner, if the resistance value RDTL of the longest dead time setting resistor 54b is set to 80 kΩ which is two times 40 kΩ, the longest dead time is 50 ns which is half thereof. If the resistance value RDTL of the longest dead time setting resistor 54b is set to 160 kΩ which is four times 40 kΩ, the longest dead time is 25 ns which is a quarter thereof.

The falling longest dead time delay circuit 55F enables the falling longest dead time delay signal DTFLp to enter a high state, when the voltage DTFL is higher than the reference voltage Vref of 1 V. That is, the falling longest dead time delay signal DTFLp is a delay signal which enters a high state after the longest dead time which is designated by the longest dead time setting resistor 54b passes from the time when the clock signal CLK enters a low state.

The falling variable dead time delay circuit 56F enables the falling variable dead time delay signal DTFVp to enter a high state, when the voltage DTFV is higher than the falling dead time setting voltage VDTF. That is, the falling variable dead time delay signal DTFVp is a delay signal which enters a high state after the time proportional to the falling dead time setting voltage VDTF passes after the clock signal CLK enters a low state. The delay time is designated by the longest dead time setting resistor 54b, when the falling dead time setting voltage VDTF is 1 V.

An output signal DTFEp of the shortest dead time limiter 59F is illustrated in a fifth row of FIG. 9. The shortest dead time limiter 59F is a latch circuit that outputs a pulse waveform of the falling variable dead time delay signal DTFVp as the output signal DTFEp, if the falling shortest dead time delay signal DTFSp is in a high state when the falling variable dead time delay signal DTFVp is received, and holds the output signal DTFEp in a low state, if the falling shortest dead time delay signal DTFSp is not yet in a high state when the falling variable dead time delay signal DTFVp is received.

In pulses P1 to P3, P5, and P6 in FIG. 9, the falling variable dead time delay signal DTFVp enters a high state after the falling shortest dead time delay signal DTFSp enters a high state. For that reason, the output signal DTFEp has the same pulse signal as the falling variable dead time delay signal DTFVp. However, in the pulse P4, the falling variable dead time delay signal DTFVp enters a high state before the falling shortest dead time delay signal DTFSp enter a high state, in a case where the falling dead time setting voltage VDTF is much lower than 1 V. In this case, the output signal DTFEp of the shortest dead time limiter 59F is maintained in a low state. In contrast, in the same manner as in a pulse P7, in a case where the falling dead time setting voltage VDTF is much higher than 1 V, the pulse waveform of the output signal DTFEp is not output.

An output signal DTFp of the longest dead time limiter 60F is illustrated in a sixth row of FIG. 9. The longest dead time limiter 60F receives the output signal DTFEp of the shortest dead time limiter 59F, and supplements the output signal with the pulse of the falling longest dead time delay signal DTFLp, when the pulse of the output signal is not output. In this example, the pulse of the output signal DTFEp is lost in the pulses P4 and P7, but the output signal is supplemented with the pulse of the falling longest dead time delay signal DTFLp. As a result, all the pulse signals of the output signal DTFp of the longest dead time limiter 60F are output. That is, the longest dead time limiter 60F serves as a logic sum circuit which outputs a logic sum of the output signal DTFEp and the falling longest dead time delay signal DTFLp.

The low-side timing signal LGp is illustrated by a solid line, and the high-side timing signal HGp is illustrated by a dashed line, in a seventh row of FIG. 9. The low-side timing signal LGp is generated by performing a logic product of the output signal DTFp of the longest dead time limiter 60F and an inverting signal of the clock signal CLK, using the down edge trimming gate 61F. Thereby, the low-side timing signal LGp is delayed only by an up-edge with respect to the inverting signal of the clock signal CLK, and nearly has no delay of a down-edge. The high-side timing signal HGp is also generated by the same operation, and thus, a waveform thereof is delayed only by the up-edge with respect to the clock signal CLK, and nearly has no delay of the down-edge.

As described above, dead time which is controlled by the falling dead time setting voltage VDTF is provided until the low-side timing signal LGp enters a high state after the high-side timing signal HGp enters a low state. Detailed description thereof will be omitted. In the same manner, dead time which is controlled by the rising dead time setting voltage VDTR is provided until the high-side timing signal HGp enters a high state after the low-side timing signal LGp enters a low state.

Hence, in a case where the dead time is equal to or longer than the shortest dead time and is equal to or shorter than the longest dead time, the drive circuit 24 generates the high-side gate signal HG synchronous to the first variable dead time delay signal DTRVp, and generates the low-side gate signal LG synchronous to the second variable dead time delay signal DTFVp.

Figure 10:
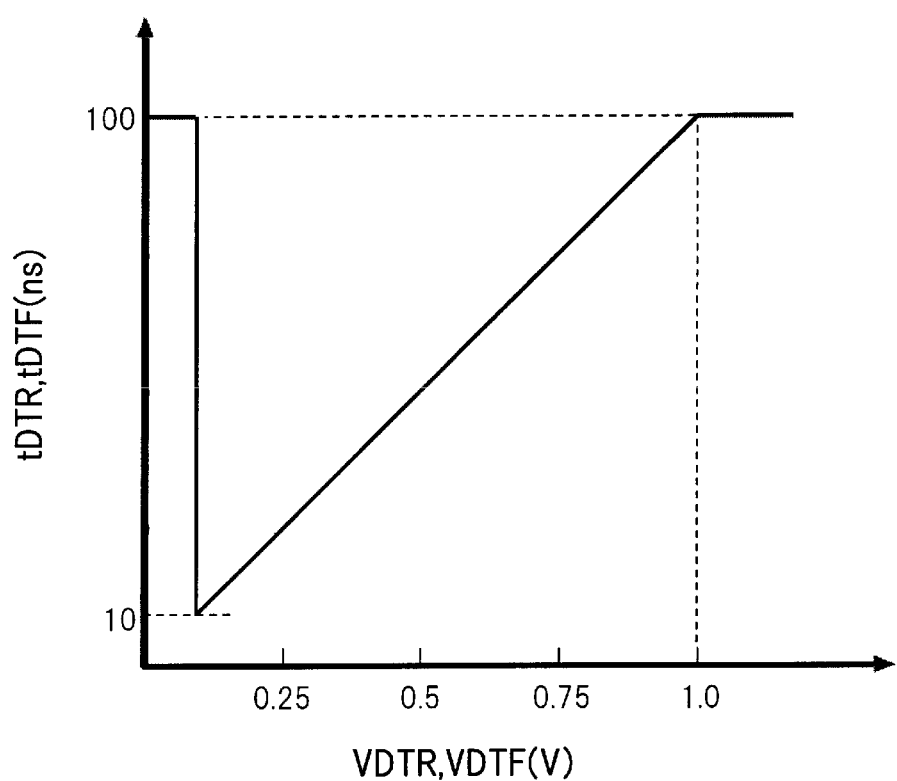
FIG. 10 is a graph illustrating a relationship between rising and falling dead time setting voltages and rising and falling dead times.

FIG. 10 is a graph illustrating a relationship between the rising and falling dead time setting voltages VDTR and VDTF and rising and falling dead times tDTR and tDTF. Here, the resistance value RDTL of the longest dead time setting resistor 54b is set to 40 kΩ.

When the rising dead time setting voltage VDTR is equal to or higher than 1 V, the rising dead time tDTR becomes a maximum value of 100 ns which is the longest dead time. When the rising dead time setting voltage VDTR is lower than 1 V, the rising dead time tDTR is proportional to the rising dead time setting voltage VDTR. Also, the lower the rising dead time setting voltage VDTR is, the shorter the rising dead time is. However, if the rising dead time setting voltage VDTR is set to a value such that the rising dead time tDTR is shorter than 10 ns, the rising dead time tDTR becomes a maximum of 100 ns. A relationship between the falling dead time setting voltage VDTF and the falling dead time tDTF is also the same as this.

As described above, the dead time delay circuit 23 sets the dead time to predetermined longest dead time, in a case where dead time is shorter than predetermined shortest dead time, and sets the dead time to the longest dead time, in a case where the dead time is longer than the longest dead time.

Figure 11:
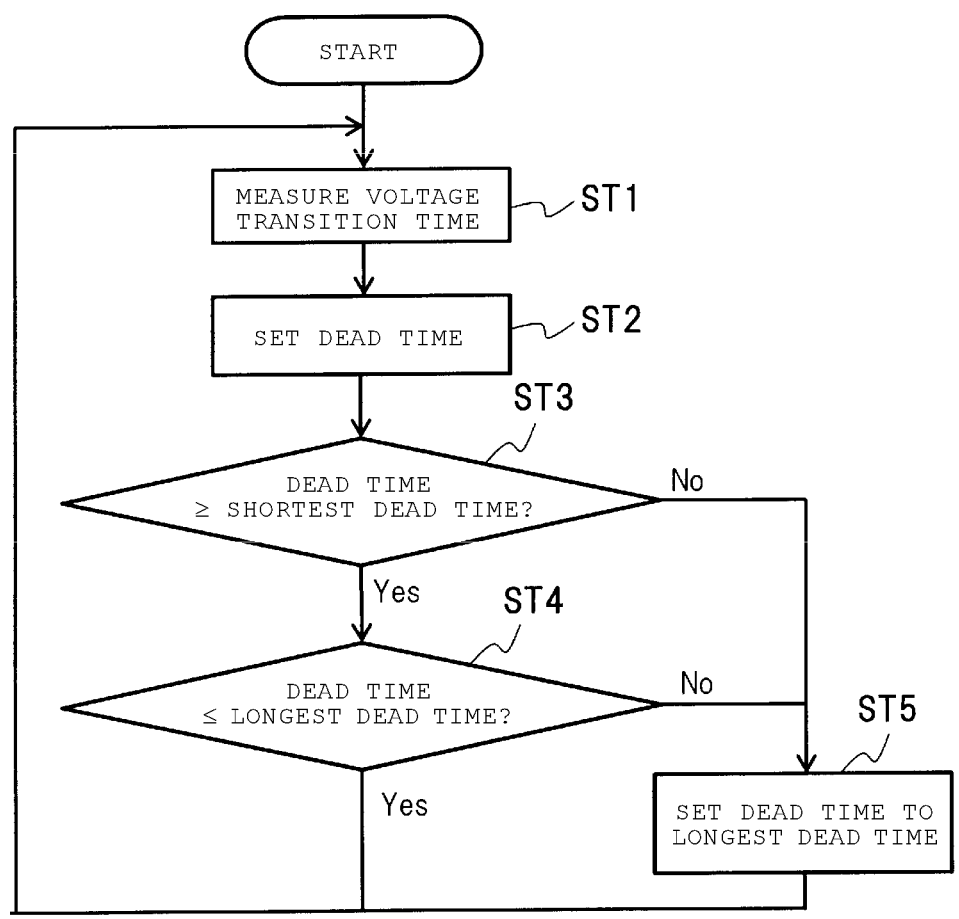
FIG. 11 is a flowchart illustrating a dead time setting method.

FIG. 11 is a flowchart illustrating a dead time setting method.

First, the voltage transition time of the switching node 4 is measured by the switching node transition time measurement circuit 22 (step ST1).

Subsequently, dead time according to the measured voltage transition time is set (step ST2). Processing of steps ST2 to ST5 is performed by the dead time delay circuit 23.

Subsequently, whether or not the dead time is equal to or longer than a minimum value is determined (step ST3). In a case where the dead time is shorter than the minimum value (step ST3; No), the dead time is set to a maximum value (step ST5), and processing returns to step ST1.

In a case where the dead time is equal to or longer than the minimum value (step ST3; No), whether or not the dead time is equal to or shorter than the maximum value is determined (step ST4). In a case where the dead time is longer than the maximum value (step ST4; No), the dead time is set to the maximum value (step ST5), and processing returns to step ST1.

In a case where the dead time is equal to or shorter than the maximum value (step ST4; Yes), processing returns to step ST1.

The dead time is automatically adjusted by the dead time delay circuit 23 having the aforementioned function as will be described hereinafter.

Figure 12:
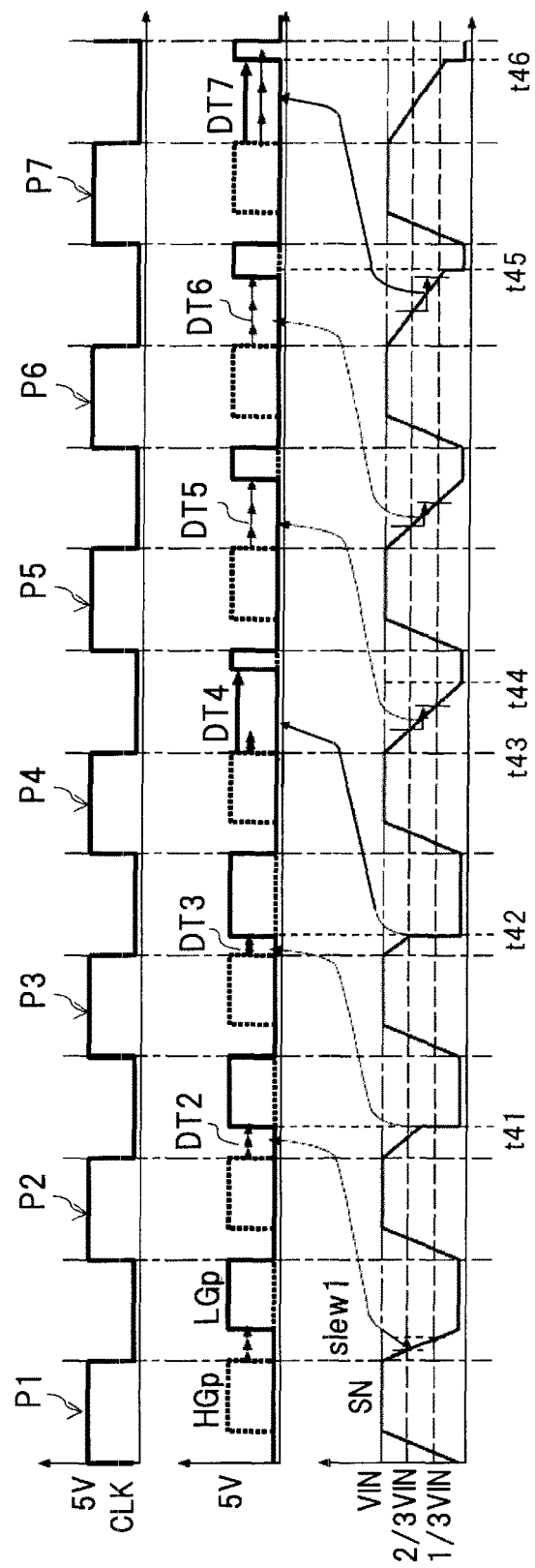
FIG. 12 is a waveform diagram illustrating a clock signal, a high-side timing signal, a low-side timing signal, and a voltage of a switching node.

FIG. 12 is a waveform diagram illustrating the clock signal CLK, the high-side timing signal HGp, the low-side timing signal LGp, and the voltage SN of the switching node 4. FIG. 12 corresponds to FIG. 9. FIG. 12 illustrates a case where a falling transition speed of the voltage SN is rapidly delayed and the transition time comes to exceeds the longest dead time.

In the pulse P1 of the clock signal CLK, a waveform of the voltage SN of the switching node 4 becomes a clean trapezoidal shape, and the rising transition time is substantially the same as the falling transition time. At this time, the dead time also has an appropriate value. Exactly When the voltage SN of the switching node 4 reaches 0 V, the low-side timing signal LGp enters a high state.

Dead time DT2 (time until the low-side timing signal LGp enters a high state after the high-side timing signal HGp enters a low state) of the pulse P2 is three times the voltage transition time slew1 (time until the voltage SN of the switching node 4 is lower than one third of the input voltage VIN after the voltage SN is lower than two thirds of the input voltage VIN) of the switching node 4 measured in the pulse P1, and is adjusted to an appropriate value. However, the transition speed of the voltage SN of the switching node 4 is rapidly delayed due to disturbance such as a load change. If so, even though the dead time DT2 is appropriately adjusted, hard switching in which the low-side switching transistor 5 is turned on occurs before the voltage SN of the switching node 4 becomes 0 V, and at that instant, the voltage SN of the switching node 4 rapidly changes to 0 V (point of time t41).

Dead time DT3 of the pulse P3 has to be originally adjusted long, but if the hard switching occurs in the same manner as in the pulse P2, the voltage transition time of the switching node 4 is measured to be short, and the dead time DT3 becomes short in reverse. If so, the low-side switching transistor 5 is turned on (point of time t42) in a state where the voltage SN of the switching node 4 is in a higher state, and the voltage transition time of the switching node 4 becomes shorter.

In the pulse P4, the falling dead time setting voltage VDTF (not illustrated) is lowered such that dead time DT4 is shorter. However, as described above, if the dead time is lower than the shortest dead time, for example, 10 ns, the longest dead time is set as, for example, 100 ns in reverse. If so, the voltage SN of the switching node 4 is autonomously changed (points of time t43 to t44), and appropriate voltage transition time can be measured.

In the pulse P5, dead time DT5 which is three times the delayed voltage transition time is set. When the voltage SN of the switching node 4 is slowly changed thereby reaching 0 V, the low-side timing signal LGp exactly enters a high state. Aa a result, it can be determined that newly set dead time DT5 is appropriate.

In the pulse P6, a change of the voltage SN of the switching node 4 is further delayed, whereby the hard switching occurs again (point of time t45). However, the hard switching occurs after the voltage SN of the switching node 4 is equal to or lower than one third of the input voltage VIN, and thus, the voltage transition time is appropriately measured.

In the pulse P7, time which is three times the measured voltage transition time of the switching node 4 is longer than the set longest dead time, for example, 100 ns. In this case, dead time DT7 is limited to the longest dead time, for example, 100 ns. Slight hard switching occurs on the switching node 4 (point of time t46), whereby there are adverse effects in which efficiency is decreased by that amount and noise increases. However, preventing an abnormal operation due to loss of a switching pulse from being performed is a more important issue, and it is possible to prevent the switching pulse from being lost by the operation, and to prevent power consumption from rapidly increasing and elements from being broken.

As described above, in the present embodiment, in a case where the dead time is shorter than the shortest dead time, the dead time is set to the longest dead time, and in a case where the dead time is longer than the longest dead time, the dead time is set to the longest dead time. As a result, it is possible to appropriately react to a rapid increase of a load current or the like, and to maintain an appropriate state, even in a situation in which an abnormal operation is performed. Hence, it is possible to provide an isolated-type AC-DC converter and the isolated-type DC-DC converter 100 which appropriately react to a rapid change of use conditions, and in addition, normally operate even in poor use conditions.

In a case where the rising dead time setting voltage VDTR is lower than a predetermined minimum voltage, the rising dead time setting voltage VDTR may be set to the predetermined maximum voltage. Also, in a case where the rising dead time setting voltage VDTR is higher than a maximum voltage, the rising dead time setting voltage VDTR may be set to the maximum voltage. The falling dead time setting voltage VDTF may be set in the same manner as above. The minimum voltage corresponds to the shortest dead time, and the maximum voltage corresponds to the longest dead time. Also according to such a configuration, dead time can be set to the longest dead time, in a case where the dead time is shorter than the shortest dead time, and the dead time can be set to the longest dead time, in a case where the dead time is longer than the longest dead time, in the same manner as in the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A DC-DC converter, comprising:
   a first switch connected between an input node and a switching node;
   a second switch connected between a reference node and the switching node;
   a first capacitor having a first terminal connected to one of the input node and the reference node;
   a second capacitor having a first terminal and a second terminal, the first terminal of the second capacitor being connected to the reference node;
   a transformer including a primary coil connected between the switching node and the second terminal of the second capacitor, and a secondary coil;

a rectification smoothing circuit connected to the secondary coil to rectify and smooth a voltage of the secondary coil; and
a drive circuit configured to control the first and second switches, such that a first dead time after the first switch is turned off until the second switch is turned on has a length corresponding to a first time period during which the voltage of the switching node is transitioning from the low state to the high state, and a second dead time after the second switch is turned off until the first switch is turned on has a length corresponding to a second time period during which the voltage of the switching node is transitioning from the high state to the low state.

2. The DC-DC converter according to claim 1, wherein the first time period is different from the second time period.

3. The DC-DC converter according to claim 1, wherein the first dead time is different from the second dead time.

4. A DC-DC converter, comprising:
a first switch connected between an input node and a switching node;
a second switch connected between a reference node and the switching node;
a first capacitor having a first terminal connected to one of the input node and the reference node;
a second capacitor having a first terminal and a second terminal, the first terminal of the second capacitor being connected to the reference node;
a transformer including a primary coil connected between the switching node and the second terminal of the second capacitor, and a secondary coil;
a rectification smoothing circuit connected to the secondary coil to rectify and smooth a voltage of the secondary coil; and
a drive circuit configured to control the first and second switches, such that a first dead time after the first switch is turned off until the second switch is turned on has a length corresponding to a second time period during which the voltage of the switching node is transitioning from the high state to the low state, and a second dead time after the second switch is turned off until the first switch is turned on has a length corresponding to a first time period during which the voltage of the switching node is transitioning from the low state to the high state.

5. The DC-DC converter according to claim 4, wherein the first time period is different from the second time period.

6. The DC-DC converter according to claim 4, wherein the first dead time is different from the second dead time.

7. The DC-DC converter according to claim 1, wherein the drive circuit includes a measurement circuit configured to output a third time period and a delay circuit configured to delay timing signals by a length corresponding to the third time period, and controls the first and second switches based on the delayed timing signals.

8. The DC-DC converter according to claim 7, wherein the measurement circuit is configured to measure a fourth time period during which a divided voltage of the switching node is transitioning between a first voltage that is lower than a divided voltage of the input node and a second voltage that is lower than the divided voltage of the input node and higher than the first voltage, and output the third time period based on the fourth time period.

9. The DC-DC converter according to claim 7, wherein when the third time period is smaller than a predetermined minimum value or when the third time period is greater than a predetermined maximum value, the delay circuit delays the timing signals by the predetermined maximum value.

10. A method for driving a DC-DC converter including a first switch connected between an input node and a switching node, a second switch connected between a reference node and the switching node, a first capacitor having a first terminal connected to one of the input node and the reference node, a second capacitor having a first terminal and a second terminal, the first terminal of the second capacitor being connected to the reference node, a transformer including a primary coil connected between the switching node and the second terminal of the second capacitor, and a secondary coil, a rectification smoothing circuit connected to the secondary coil to rectify and smooth a voltage of the secondary coil, the method comprising:
measuring a first time period during which the voltage of the switching node is transitioning from the low state to the high state;
measuring a second time period during which the voltage of the switching node is transitioning from the high state to the low state; and
controlling the first and second switches, such that a first dead time after the first switch is turned off until the second switch is turned on has a length corresponding to the first time period and a second dead time after the second switch is turned off until the first switch is turned on has a length corresponding to the second time period.

11. The method according to claim 10, wherein the first time period is different from the second time period.

12. The method according to claim 10, wherein the first dead time is different from the second dead time.

13. A method for driving a DC-DC converter including a first switch connected between an input node and a switching node, a second switch connected between a reference node and the switching node, a first capacitor having a first terminal connected to one of the input node and the reference node, a second capacitor having a first terminal and a second terminal, the first terminal of the second capacitor being connected to the reference node, a transformer including a primary coil connected between the switching node and the second terminal of the second capacitor, and a secondary coil, a rectification smoothing circuit connected to the secondary coil to rectify and smooth a voltage of the secondary coil, the method comprising:
measuring a first time period during which the voltage of the switching node is transitioning from the low state to the high state;
measuring a second time period during which the voltage of the switching node is transitioning from the high state to the low state; and
controlling the first and second switches, such that a first dead time after the first switch is turned off until the second switch is turned on has a length corresponding to the second time period and a second dead time after the second switch is turned off until the first switch is turned on has a length corresponding to the first time period.

14. The method according to claim 13, wherein the first time period is different from the second time period.

15. The method according to claim 13, wherein the first dead time is different from the second dead time.

16. The method according to claim 10, wherein
timing signals are delayed by a length corresponding to a third time period, and switching signals generated based on the delayed timing signals are output to the first and second switches as control signal for the first and second switches.

17. The method according to claim 16, wherein said measuring the third time period includes:
measuring a fourth time period during which a divided voltage of the switching node transitions between a first voltage that is lower than a divided voltage of the input node and a second voltage that is lower than the divided voltage of the input node and higher than the first voltage, wherein the third time period is proportional to the fourth time period.

18. The method according to claim 16, wherein
when the third time period is smaller than a predetermined minimum value or when the third time period is greater than a predetermined maximum value, the timing signals are delayed by the predetermined maximum value.

* * * * *